(12) United States Patent
Izawa et al.

(10) Patent No.: US 9,277,201 B2
(45) Date of Patent: *Mar. 1, 2016

(54) IMAGE PROCESSING DEVICE AND METHOD, AND IMAGING DEVICE

(71) Applicant: FUJIFILM Corporation, Tokyo (JP)

(72) Inventors: Katsutoshi Izawa, Saitama (JP); Shuji Ono, Saitama (JP); Junji Hayashi, Saitama (JP); Tomoyuki Kawai, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,933

(22) Filed: Sep. 29, 2014

(65) Prior Publication Data

US 2015/0015677 A1  Jan. 15, 2015

Related U.S. Application Data

(63) Continuation of application No. PCT/JP2013/055373, filed on Feb. 28, 2013.

(30) Foreign Application Priority Data

Mar. 30, 2012  (JP) ................................ 2012-082078

(51) Int. Cl.
*H04N 13/02*  (2006.01)
*H04N 13/00*  (2006.01)
(Continued)

(52) U.S. Cl.
CPC ............ *H04N 13/0018* (2013.01); *G03B 35/10* (2013.01); *H04N 5/23229* (2013.01);
(Continued)

(58) Field of Classification Search
CPC . H04N 5/3656; H04N 5/357; H04N 13/0025; H04N 5/23296; H04N 5/23212; H04N 13/0018; H04N 5/23229; G06T 5/50; G06T 5/40; G06T 5/30; G06T 5/10; G06T 5/20; G03B 35/10

See application file for complete search history.

(56) References Cited

U.S. PATENT DOCUMENTS 5,588,948 A * 12/1996 Takahashi et al. ............ 600/111
8,933,995 B2 *  1/2015 Endo ............................... 348/49

(Continued)

FOREIGN PATENT DOCUMENTS

JP    2011-29700 A    2/2011
JP    2011-199502 A   10/2011

(Continued)

OTHER PUBLICATIONS

International Search Report, issued in PCT/JP2013/055373, dated Apr. 16, 2013.

(Continued)

*Primary Examiner* — Jay Au Patel
*Assistant Examiner* — Neil Mikesha
(74) *Attorney, Agent, or Firm* — Birch, Stewart, Kolasch & Birch, LLP

(57) ABSTRACT

An image processing method according to the present invention acquires a first image and second image that are picked up through a single image-taking optical system, that are images after a pupil division, and that have a parallax to each other, and then performs a filtering process for each pixel of the first and second images, using first and second transform filters that correspond to the parallax for the pixel and that are of first and second transform filter groups to be respectively applied to the first and second images for the transform into third and fourth images in which the parallax amount and blur amount of the first and second images have been altered.

24 Claims, 28 Drawing Sheets

(51) Int. Cl.
*H04N 5/232* (2006.01)
*G03B 35/10* (2006.01)

(52) U.S. Cl.
CPC ....... *H04N5/23245* (2013.01); *H04N 13/0022* (2013.01); *H04N 13/0207* (2013.01); *H04N 13/0225* (2013.01); *H04N 13/0257* (2013.01); *H04N 2013/0081* (2013.01)

(56) References Cited

U.S. PATENT DOCUMENTS

| | | | |
|---|---|---|---|
| 2002/0109701 A1* | 8/2002 | Deering | 345/581 |
| 2005/0190258 A1* | 9/2005 | Siegel et al. | 348/47 |
| 2008/0218611 A1* | 9/2008 | Parulski et al. | 348/262 |
| 2011/0018969 A1 | 1/2011 | Tanaka | |
| 2011/0064327 A1* | 3/2011 | Dagher et al. | 382/263 |
| 2012/0113287 A1* | 5/2012 | Johnson et al. | 348/222.1 |
| 2012/0249750 A1* | 10/2012 | Izzat et al. | 348/47 |
| 2012/0301012 A1* | 11/2012 | Kakishita et al. | 382/154 |
| 2012/0314908 A1* | 12/2012 | Hirasawa et al. | 382/106 |
| 2013/0010078 A1 | 1/2013 | Aoki | |
| 2013/0010086 A1 | 1/2013 | Iwasaki | |
| 2013/0033578 A1* | 2/2013 | Wajs | 348/46 |
| 2013/0107019 A1 | 5/2013 | Ooshima et al. | |
| 2013/0120543 A1* | 5/2013 | Chen et al. | 348/51 |
| 2013/0182082 A1 | 7/2013 | Hayashi | |
| 2013/0195347 A1* | 8/2013 | Okada et al. | 382/154 |
| 2013/0215105 A1* | 8/2013 | Yonezu | 345/419 |
| 2014/0168206 A1* | 6/2014 | Barenbrug | 345/419 |
| 2014/0270485 A1* | 9/2014 | Kauff et al. | 382/154 |
| 2015/0015677 A1* | 1/2015 | Izawa et al. | 348/49 |

FOREIGN PATENT DOCUMENTS

| | | |
|---|---|---|
| JP | 2011-211551 A | 10/2011 |
| JP | 2011-259211 A | 12/2011 |
| WO | WO 2011/118077 A1 | 9/2011 |
| WO | WO 2011/118089 A | 9/2011 |
| WO | WO 2012/002071 A1 | 1/2012 |
| WO | WO 2012/032826 A1 | 3/2012 |

OTHER PUBLICATIONS

Written Opinion of the International Searching Authority, issued in PCT/JP2013/055373, dated Apr. 16, 2013.
International Search Report, issued in PCT/JP2013/062749, dated Jun. 4, 2013.
Office Action, dated Jun. 22, 2015, in related pending U.S. Appl. No. 14/534,343.
Written Opinion of the International Searching Authority, issued in PCT/JP2013/062749, dated Jun. 4, 2013.

* cited by examiner

SENSITIVITY CHARACTERISTIC FOR EACH ANGLE

SEMILUNAR FILTER $$\Delta D = F \times \rho(F) \times R = \frac{\rho(F) \, |L_0 - L| \, f^2}{(L_0 - f) L}$$

$$R = \frac{|L_0 - L| \, f^2}{(L_0 - f) LF}$$

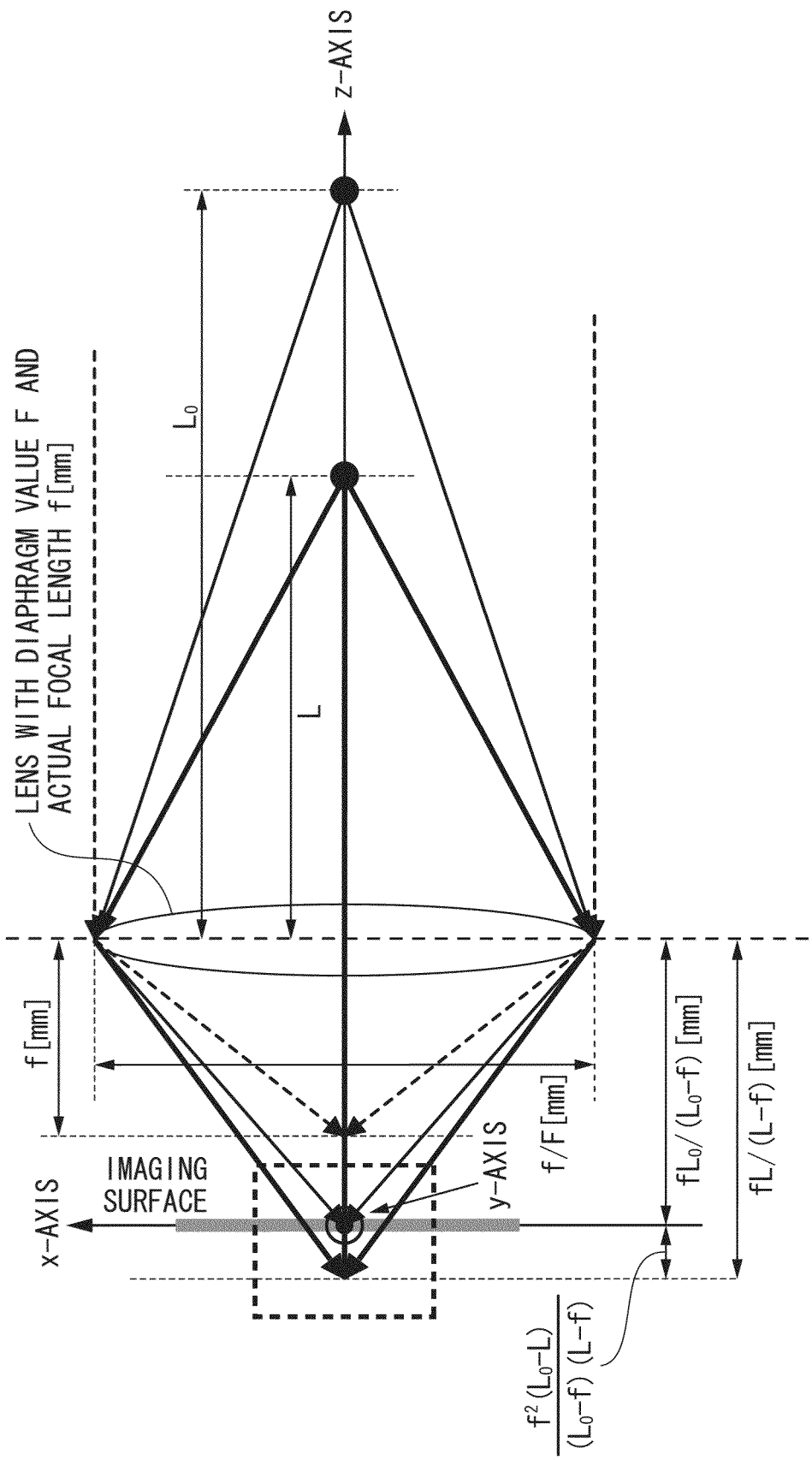

EXAMPLE OF FILTERS APPLIED
TO LEFT-EYE IMAGE

EXAMPLE OF FILTERS APPLIED
TO RIGHT-EYE IMAGE

CURRENTLY APPLIED SEMILUNAR FILTER $$\Delta D = \frac{\rho(F)|L_0-L|f^2}{(L_0-f)L}$$

$$R = \frac{|L_0-L|f^2}{(L_0-f)LF}$$

SEMILUNAR FILTER TO BE DESIGNED IN THE EXAMPLE
(GENERATE PARALLAX AND BLUR WHEN FOCAL LENGTH f IS CHANGED BY 2-FOLD)

$$\Delta D = 4\frac{\rho(F)|L_0-L|f^2}{(L_0-f)L}$$

$$R = 4\frac{|L_0-L|f^2}{(L_0-f)LF}$$

CURRENTLY APPLIED SEMILUNAR FILTER $$\Delta D = \frac{\rho(F)|L_0-L|f^2}{(L_0-f)L}$$

$$R = \frac{|L_0-L|f^2}{(L_0-f)LF}$$

SEMILUNAR FILTER TO BE DESIGNED IN THE EXAMPLE
(GENERATE PARALLAX AND BLUR WHEN
F-VALUE IS CHANGED TO HALF)

$$\Delta D = \frac{\rho(0.5F)|L_0-L|f^2}{(L_0-f)L}$$

$$R = \frac{2|L_0-L|f^2}{(L_0-f)LF}$$

$$\Delta D = \frac{\rho(F)|L_0-L|f^2}{(L_0-f)L}$$

$$R = \frac{|L_0-L|f^2}{(L_0-f)LF}$$

CURRENTLY APPLIED SEMILUNAR FILTER $$\Delta D = 2.25 \frac{\rho(F)|L_0-L|f^2}{(L_0-f)L}$$

$$R = 2.25 \frac{|L_0-L|f^2}{(L_0-f)LF}$$

SEMILUNAR FILTER TO BE DESIGNED IN THE EXAMPLE
(GENERATE PARALLAX AND BLUR WHEN IMAGING
ELEMENT SIZE IS CHANGED BY 1.5-FOLD)

CURRENTLY APPLIED SEMILUNAR FILTER

SEMILUNAR FILTER TO BE DESIGNED IN THE EXAMPLE
(GENERATE PARALLAX AND BLUR WHEN SENSITIVITY
CHARACTERISTIC OF IMAGING ELEMENT IS CHANGED)

PROCESS FOR OBTAINING MULTIPLE KINDS OF PARALLAXES AND BLURS FROM SINGLE IMAGE
(ORDINARY PROCESS)

PROCESS FOR OBTAINING MULTIPLE KINDS OF PARALLAXES AND BLURS FROM SINGLE IMAGE
(CALCULATION-TIME SHORTENING PROCESS)

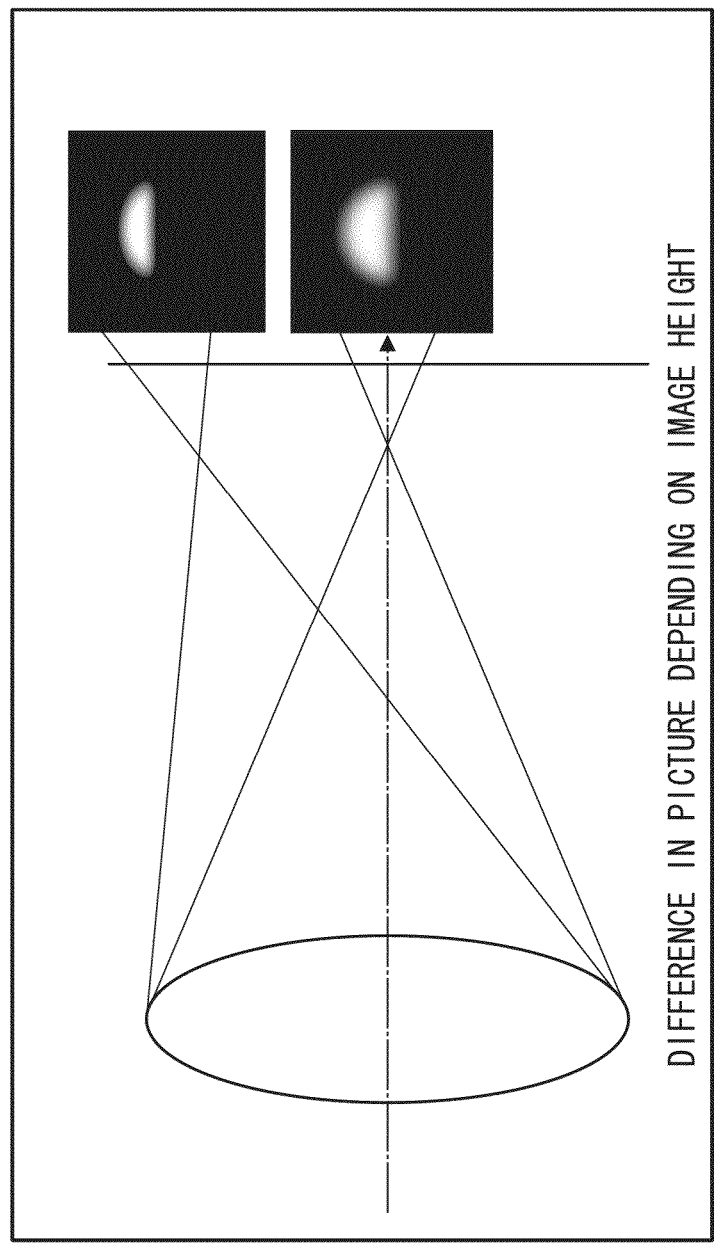

INCIDENT LIGHT FROM LEFTMOST SIDE: INCIDENCE ANGLE OF −15°

INCIDENT LIGHT FROM RIGHTMOST SIDE: INCIDENCE ANGLE OF 15°

(INCIDENCE ANGLE CHARACTERISTIC FOR OBJECT AT CENTER OF SCREEN)

INCIDENT LIGHT FROM LEFTMOST SIDE: INCIDENCE ANGLE OF −7°

INCIDENT LIGHT FROM RIGHTMOST SIDE: INCIDENCE ANGLE OF 23°

(INCIDENCE ANGLE CHARACTERISTIC FOR OBJECT AT EDGE OF SCREEN)

IMAGE PROCESSING DEVICE AND METHOD, AND IMAGING DEVICE

CROSS-REFERENCE TO RELATED APPLICATIONS

This application is a Continuation of PCT International Application No. PCT/JP2013/055373 filed on Feb. 28, 2013, which claims priority under 35 U.S.C §119(a) to Japanese Patent Application No. 2012-82078 filed on Mar. 30, 2012. Each of the above application(s) is hereby expressly incorporated by reference, in its entirety, into the present application.

BACKGROUND OF THE INVENTION

1. Field of the Invention

The present invention relates to an image processing device and method, and an imaging device, and particularly, relates to a technology for adjusting a parallax of an image for stereovision that is picked up through a single image-taking lens and that has a parallax.

2. Description of the Related Art

Conventionally, a monocular 3D imaging device in which a phase-difference CCD (Charge Coupled Device) performs, by pupil division, the forming of respective subject images having passed through left-right-directionally different regions of a single image-taking lens and performs photoelectric conversion of the respective subject images having passed through the regions, and that acquires a left-eye image and a right-eye image (monocular 3D images) having a parallax to each other depending on the focus deviation amount, is known PTL 1 (Japanese Patent Application Laid-Open No. 2011-199502). The stereoscopic imaging device described in PTL 1 adjusts the parallax for the monocular 3D left-eye image and right-eye image, by the F-value of a diaphragm.

An image processing device described in PTL 2 (Japanese Patent Application Laid-Open No. 2011-211551) calculates the parallax amount for pixels corresponding to each other between left and right viewpoint images, generates an initial parallax map indicating the distribution of the parallax amount, selects a parallax template corresponding to a partial region in the parallax map, from previously determined multiple parallax templates indicating external shapes and parallax amount distributions, by comparing the partial region and the parallax template, and then, generates multi-viewpoint images in which the number of viewpoints is larger than the left and right viewpoint images, based on a parallax map replaced with the selected parallax template. Further, paragraph [0048] in PTL 2 describes that the technology described in PTL 2 can be applied to monocular 3D images.

PTL 3 (Japanese Patent Application Laid-Open No. 2011-29700) describes a technology of adjusting the parallax between a left-eye image and a right-eye image by mutually shifting the left-eye image and right-eye image that are picked up by a compound-eye imaging device and that have a parallax.

SUMMARY OF THE INVENTION

In the monocular 3D imaging device described in PTL 1, which adjusts the parallax for monocular 3D images by adjusting the F-value of the diaphragm, the adjustment of the parallax can be performed only at the time of the pickup with the monocular 3D imaging device. That is, it is impossible to generate monocular 3D images different in parallax (F-value), by performing an image process of monocular 3D images.

The invention described in PTL 2 can generate a left-eye image and right-eye image different in parallax, by performing an image process of monocular 3D images. However, the generated left-eye image and right-eye image are not monocular 3D images.

Here, the monocular 3D image is an image in which the blur increases as the parallax increases. As one of the advantages of the monocular 3D image, there is an advantage that a double image hardly appears even when being viewed through a 3D television with 3D-dedicated glasses taken off (an advantage that it can be viewed as a 2D image).

The left-eye image and right-eye image described in PTL 3 are images picked-up by the compound-eye imaging device, and are not monocular 3D images. Also, the images in which the parallax has been adjusted by mutually shifting the left-eye image and the right-eye image are not monocular 3D images.

The present invention, which has been made in view of such circumstances, has an object to provide an image processing device and method, and an imaging device that make it possible to generate intended images for stereovision in which the parallax amount and the blurring amount have been adjusted in conjunction, from monocular 3D images picked-up by a monocular 3D imaging device.

For achieving the object, an image processing device according to an aspect of the present invention includes: an image acquisition device for acquiring a first image and a second image that are picked up through a single image-taking optical system and that have a parallax to each other, the first image and the second image being images after a pupil division by a pupil-division device; a parallax acquisition device for acquiring a parallax between corresponding pixels of the acquired first image and second image; and a filtering processing device for performing a filtering process for each pixel of the acquired first image and second image, using a first transform filter and a second transform filter corresponding to the parallax for the pixel acquired by the parallax acquisition device, the first transform filter and the second transform filter being of a first transform filter group and a second transform filter group for transforming into a third image and a fourth image in which a parallax amount and a blur amount of the acquired first image and second image have been altered, the first transform filter group being applied to the first image, the second transform filter group being applied to the second image.

According to an aspect of the present invention, for each pixel of the first image and the second image, the filtering process is performed by the first transform filter and second transform filter corresponding to the parallax for the pixel, and thereby, both the parallax amount and the blur amount are adjusted in conjunction.

In an image processing device according to an alternative aspect of the present invention, it is preferable that the filtering processing device increase the blur amount, as the parallax amount between corresponding pixels of the third image and the fourth image increases. Thereby, the third and fourth images allow for a stereovision by a 3D display, and a double image hardly appears even when being viewed with 3D-dedicated glasses taken off.

An image processing device according to a further alternative aspect of the present invention includes: a digital filter storage device for storing a first digital filter group and a second digital filter group for each parallax, the first digital filter group and the second digital filter group corresponding to a transform characteristic by which light entering the single image-taking optical system is transformed into the first image and the second image; and a transform filter calculation device for calculating the first transform filter group and the second transform filter group, based on the stored first digital filter group and second digital filter group, and a third digital filter group and a fourth digital filter group for each pixel, the third digital filter group and the fourth digital filter group corresponding to a transform characteristic by which the light entering the single image-taking optical system is transformed into the third image and the fourth image, in which, for each pixel of the acquired first image and second image, based on the parallax for the pixel acquired by the parallax acquisition device, the filtering processing device selects the first transform filter and second transform filter corresponding to the parallax, from the calculated first transform filter group and second transform filter group, and then performs the filtering process using the selected first transform filter and second transform filter.

The digital filter storage device stores the first digital filter group and second digital filter group for each parallax that correspond to the transform characteristic by which the light entering the single image-taking optical system is transformed into the first image and the second image. These first digital filter group and second digital filter group can be previously acquired from the characteristics of the image-taking optical system, the pupil-division device, the imaging element and the like, by simulation or by a survey of a point image.

The transform filter calculation device calculates the first and second transform filters for transforming the first and second images into the third and fourth images, based on the first and second digital filter groups and the third and fourth digital filter groups.

In an image processing device according to a further alternative aspect of the present invention, it is preferable that the transform filter calculation device calculate a transform filter to be convoluted in real space, by an amplitude component of the following formula, $F^{-1}(T_f(\omega_x, \omega_y)^{-1} \cdot T_{wf}(\omega_x, \omega_y))$ (here, $F^{-1}$: Fourier inverse transform), when any one digital filter of the first digital filter group and second digital filter group stored in the digital filter storage device is $T(x, y)$, the digital filter $T(x, y)$ to which Fourier transform has been performed is $T_f(\omega_x, \omega_y)$, a digital filter that is of the third digital filter group and the fourth digital filter group and that corresponds to the digital filter $T(x, y)$ is $T_w(x, y)$, and the digital filter $T_w(x, y)$ to which Fourier transform has been performed is $T_{wf}(\omega_x, \omega_y)$.

An image processing device according to a further alternative aspect of the present invention, preferably should include: a specification device for specifying a transform characteristic for the third image and fourth image that are to be generated by the transform; and a digital filter calculation device for calculating the third digital filter group and fourth digital filter group corresponding to the specified transform characteristic, in which the transform filter calculation device calculates the first transform filter group and the second transform filter group, using the first digital filter group and second digital filter group stored in the digital filter storage device, and the third digital filter group and fourth digital filter group calculated by the digital filter calculation device.

An image processing device according to a further alternative aspect of the present invention includes a transform filter storage device for storing the first transform filter group and second transform filter group for each parallax that are calculated based on a first digital filter group and second digital filter group for each parallax and a third digital filter group and fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image, in which, for each pixel of the acquired first image and second image, based on the parallax for the pixel acquired by the parallax acquisition device, the filtering processing device reads the first transform filter and second transform filter corresponding to the parallax, from the stored first transform filter group and second transform filter group, and then performs the filtering process using the read first transform filter and second transform filter.

According to this, it is unnecessary to calculate the first and second transform filter groups, allowing for the achievement of the speed-up of the filtering process for generating the third and fourth images from the first and second images. However, it is necessary to previously store the first and second transform filter groups for each of the third and fourth images, leading to a disadvantage that the storage capacity of the transform filter storage device is increased when a large number of third and fourth images are intended.

In an image processing device according to a further alternative aspect of the present invention, the transform filter storage device stores a transform filter to be convoluted in real space, the transform filter being calculated by an amplitude component of the following formula, $F^{-1}(T_f(\omega_x, \omega_y)^{-1} \cdot T_{wf}(\omega_x, \omega_y))$ (here, $F^{-1}$: Fourier inverse transform), when any one digital filter of the first digital filter group and second digital filter group is $T(x, y)$, the digital filter $T(x, y)$ to which Fourier transform has been performed is $T_f(\omega_x, \omega_y)$, a digital filter that is of the third digital filter group and fourth digital filter group and that corresponds to the digital filter $T(x, y)$ is $T_w(x, y)$, and the digital filter $T_w(x, y)$ to which Fourier transform has been performed is $T_{wf}(\omega_x, \omega_y)$.

An image processing device according to a further alternative aspect of the present invention includes a specification device for specifying a transform characteristic for the third image and fourth image that are to be generated by the transform, in which the transform filter storage device stores the first transform filter group and second transform filter group for each transform characteristic that are calculated based on a first digital filter group and second digital filter group for each parallax and a third digital filter group and fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image and supporting multiple transform characteristics that can be specified by the specification device, and the filtering processing device reads the first transform filter group and second transform filter group corresponding to the transform characteristic specified by the specification device, from the transform filter storage device, and uses the first transform filter group and the second transform filter group.

An image processing device according to a further alternative aspect of the present invention includes an inverse filter storage device for storing an inverse filter group of a first digital filter group or second digital filter group for each parallax, the first digital filter group or the second digital filter group corresponding to a transform characteristic by which light entering the single image-taking optical system is transformed into the first image or the second image, in which the filtering processing device uses the stored inverse filter group, and a third digital filter group and fourth digital filter group for each parallax, as the first transform filter group and the second transform filter group, the third digital filter group and the fourth digital filter group corresponding to a transform characteristic by which the light entering the single image-taking optical system is transformed into the third image and the fourth image.

For each pixel of the first image or second image, the inverse filter for each parallax of the pixel is applied, and thereby, images in which the parallax amount and the blur amount have been canceled are generated. To the images, the third digital filter and fourth digital filter for each parallax are applied, and thereby, the third image and the fourth image can be obtained.

An image processing device according to a further alternative aspect of the present invention includes: a specification device for specifying a transform characteristic for the third image and fourth image that are to be generated by the transform; and a digital filter calculation device for calculating the third digital filter group and fourth digital filter group corresponding to the specified transform characteristic, in which the filtering processing device uses the third digital filter group and fourth digital filter group calculated by the digital filter calculation device.

In an image processing device according to a further alternative aspect of the present invention, the transform characteristic for the third image and fourth image to be specified by the specification device is at least one of a focal length, a diaphragm value, an imaging element size and a sensitivity characteristic of the image-taking optical system, the focal length, the diaphragm value, the imaging element size and the sensitivity characteristic being different from the first image and the second image.

Thereby, although the third and fourth images are not actually picked up, it is possible to generate the third and fourth images that are obtained in the case of altering at least one of the focal length, diaphragm value, imaging element size and sensitivity characteristic when the first and second images are picked up.

In an image processing device according to a further alternative aspect of the present invention, it is preferable that the third digital filter group and the fourth digital filter group have similar shapes to which the first digital filter group and the second digital filter group are scaled. The third and fourth images transformed based on these third digital filter group and fourth digital filter group allows for a stereovision by a 3D display, and are images (monocular 3D images that are picked up by a monocular 3D imaging device) that hardly produces a double image even when being viewed with 3D-dedicated glasses taken off.

In an image processing device according to a further alternative aspect of the present invention, the third digital filter group and the fourth digital filter group may be digital filter groups in which each filter has a circular shape and a point-symmetric filter coefficient. In this case, when being viewed with 3D-dedicated glasses taken off, a double image appears. However, even when the corresponding between pixels is difficult for human eyes (the stereovision is difficult), for example, even when the blur is large, it is possible to generate the third and fourth images that make the stereovision easy.

In an image processing device according to a further alternative aspect of the present invention, it is preferable that in acquisition of the third image and fourth image with multiple transform characteristics, the filtering processing device, for each pixel of the acquired first image or second image, perform a first operation to apply an inverse filter of the first digital filter or second digital filter corresponding to the parallax for the pixel, and then apply, to the result of the first operation, the third digital filter and fourth digital filter corresponding to the third image and fourth image with the multiple transform characteristics, respectively.

By the first operation, an image in which the parallax and the blur have been canceled are generated, and then, the third digital filter and fourth digital filter respectively corresponding to the third image and fourth image with multiple transform characteristics are applied to the pixels of the image, so that the third image and the fourth image are generated. Therefore, the first operation is needed only one time, allowing for the achievement of the shortening of the calculation time.

In an image processing device according to a further alternative aspect of the present invention, it is preferable that, as the first digital filter group and second digital filter group, a first digital filter group and second digital filter group having left-right symmetry to each other at a center of an image and changing the left-right symmetry depending on an image height in a pupil-division direction be used.

Here, the first and second digital filter groups are filters for each parallax corresponding to the transform characteristic by which the light entering the single image-taking optical system is transformed into the first and second images. For obtaining appropriate first and second transform filters (intended third and fourth images), it is important to accurately comprehend what filters are applied to the first and second images. Then, the sensitivities of the first and second images to be acquired by the pupil division are different depending on the incidence angle, and therefore, in the first and second digital filters, which have left-right symmetry to each other at the center of the image, the left-right symmetry changes depending on the image height in the pupil-division direction. Accordingly, it is preferable to use the first and second digital filters that are different depending on the image height.

In an image processing device according to a further alternative aspect of the present invention, it is preferable that, as the first digital filter group and second digital filter group, a first digital filter group and second digital filter group having shapes into which an opening shape of a diaphragm is divided be used, the diaphragm being included in the image-taking optical system, the opening shape of the diaphragm being an shape when the first image and the second image are acquired.

The first and second digital filter groups are comparable to blur images of a point image (blur images that are different depending on the parallax) after the pupil division, respectively, and have shapes into which the opening shape of the diaphragm of a lens is divided. For example, when the diaphragm opening has a circular shape, the first and second digital filter groups have shapes into which it is two-divided, and when the diaphragm opening has a polygonal shape, the first and second digital filter groups have shapes into which it is two-divided. Accordingly, it is preferable that the first and second digital filter groups be adapted to the opening shape of the diaphragm at the time of the pickup of monocular 3D images.

In an image processing device according to a further alternative aspect of the present invention, it is preferable that the first image and the second image be color images that are output from a color imaging element and that have three primary colors, and as the first digital filter group and second digital filter group, first digital filter groups and second digital filter groups that are different for each color, corresponding to a sensitivity characteristic for each color of the color imaging element be used.

The first and second sensitivities for the incidence angle of the light entering the color imaging element are different for each color of the three primary colors. Accordingly, it is preferable that the first and second digital filters, which are designed based on these sensitivities, be designed for each color.

In an image processing device according to a further alternative aspect of the present invention, it is preferable that, as the third digital filter group and fourth digital filter group, a third digital filter group and fourth digital filter group corresponding to a particular color of the three primary colors of the color images be used. Thereby, it is possible to eliminate the influence of the difference in the picture shape for each color, and to achieve the improvement of the image quality.

In an image processing device according to a further alternative aspect of the present invention, it is preferable that the first image and the second image be color images that are output from a color imaging element and that have three primary colors, the parallax acquisition device calculate the parallax between the corresponding pixels of the acquired first image and second image, for each color, and the filtering processing device perform the filtering process for the acquired first image and second image, for each color.

Since the lens has a chromatic aberration, the blur (the parallax) is different for each color. Accordingly, it is preferable to acquire the parallax between corresponding pixels of the first and second images, for each color, and to transform the first and second images into the third and fourth images, based on the parallax that is different for each color. Thereby, it is possible to eliminate the influence of the chromatic aberration of the three primary colors, and to achieve the improvement of the image quality.

An imaging device according to a further alternative aspect of the present invention includes: a single image-taking optical system; an imaging element on which subject images are formed respectively, the subject images being images having passed through a first region and a second region and being images after a pupil division, the first region and the second region being different regions in the image-taking optical system, the imaging element performing a photoelectric conversion of the subject images having passed through the first region and the second region and outputting a first image and a second image, respectively; an image acquisition device for acquiring the first image and second image output from the imaging element; and any image processing device described above.

An image processing method according to a further alternative aspect of the present invention includes: an image acquisition step for acquiring a first image and a second image that are picked up through a single image-taking optical system and that have a parallax to each other, the first image and the second image being images after a pupil division by a pupil-division device; a parallax acquisition step for acquiring a parallax between corresponding pixels of the acquired first image and second image; and a filtering processing step for performing a filtering process for each pixel of the acquired first image and second image, using a first transform filter and a second transform filter corresponding to the parallax for the pixel acquired by the parallax acquisition step, the first transform filter and the second transform filter being of a first transform filter group and a second transform filter group for transforming into a third image and a fourth image in which a parallax amount and a blur amount of the acquired first image and second image have been altered, the first transform filter group being applied to the first image, the second transform filter group being applied to the second image.

An image processing method according to a further alternative aspect of the present invention further includes: a step for preparing a digital filter storage device for storing a first digital filter group and a second digital filter group for each parallax, the first digital filter group and the second digital filter group corresponding to a transform characteristic by which light entering the single image-taking optical system is transformed into the first image and the second image; and a transform filter calculation step for calculating the first transform filter group and the second transform filter group, based on the stored first digital filter group and second digital filter group, and a third digital filter group and a fourth digital filter group for each pixel, the third digital filter group and the fourth digital filter group corresponding to a transform characteristic by which the light entering the single image-taking optical system is transformed into the third image and the fourth image, in which, in the filtering processing step, for each pixel of the acquired first image and second image, based on the parallax for the pixel acquired by the parallax acquisition step, the first transform filter and second transform filter corresponding to the parallax are selected from the calculated first transform filter group and second transform filter group, and then the filtering process is performed using the selected first transform filter and second transform filter.

An image processing method according to a further alternative aspect of the present invention further includes a step for preparing a transform filter storage device for storing the first transform filter group and second transform filter group for each parallax that are calculated based on a first digital filter group and second digital filter group for each parallax and a third digital filter group and fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image, in which, in the filtering processing step, for each pixel of the acquired first image and second image, based on the parallax for the pixel acquired by the parallax acquisition step, the first transform filter and second transform filter corresponding to the parallax are read from the stored first transform filter group and second transform filter group, and then the filtering process is performed using the read first transform filter and second transform filter.

An image processing method according to a further alternative aspect of the present invention further includes a step for preparing an inverse filter storage device for storing an inverse filter group of a first digital filter group or second digital filter group for each parallax, the first digital filter group or the second digital filter group corresponding to a transform characteristic by which light entering the single image-taking optical system is transformed into the first image or the second image, in which, in the filtering processing step, the stored inverse filter group, and a third digital filter group and fourth digital filter group for each parallax are used as the first transform filter group and the second transform filter group, the third digital filter group and the fourth digital filter group corresponding to a transform characteristic by which the light entering the single image-taking optical system is transformed into the third image and the fourth image.

According to the present invention, it is possible to generate intended third and fourth images for stereovision in which the parallax amount and the blurring amount have been adjusted in conjunction, from a first image and second image (monocular 3D images) having a parallax to each other, for which the pickup through a single image-taking optical system and the pupil division by a pupil-division device have been performed. Further, by specifying, for the intended third and fourth images, at least one of the focal length, diaphragm value, imaging element size and sensitivity characteristic of the image-taking optical system, which is different from the first and second images, it is possible to generate the third and fourth images that are obtained in the case of altering at least one of the focal length, diaphragm value, imaging element size and sensitivity characteristic when the first and second images are picked up, although the third and fourth images are not actually picked up.

BRIEF DESCRIPTION OF THE DRAWINGS

FIG. 6 is a diagram to be used for explaining a creation method of a semilunar filter.

FIG. 21 is a diagram to be used for explaining the first and second semilunar filters depending on the image height.

DETAILED DESCRIPTION OF THE PREFERRED EMBODIMENTS

Hereinafter, embodiments of an image processing device and method and an imaging device according to the present invention are explained with reference to the accompanying drawings.

[Imaging Device]

Figure 1:
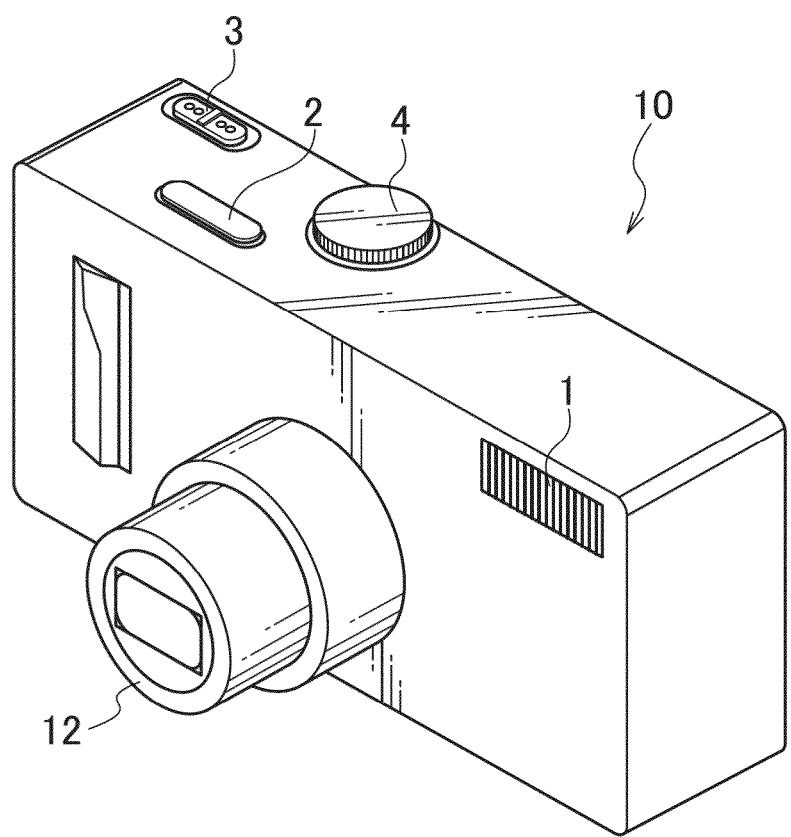
FIG. 1 is a perspective view showing an embodiment of an imaging device according to the present invention.
Figure 2:
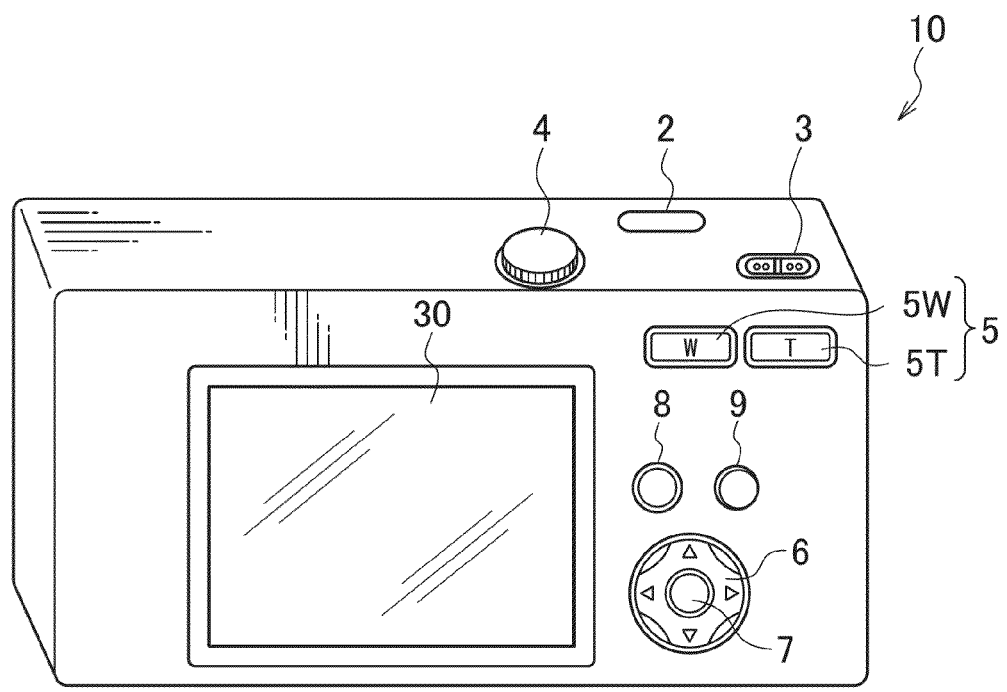
FIG. 2 is a back view of the imaging device shown in FIG. 1.

FIG. 1 and FIG. 2 are a perspective view and a back view showing an embodiment of an imaging device according to the present invention, respectively. This imaging device 10 is a digital camera that receives the light having passed through a lens with an imaging element, transforms it into a digital signal, and records it in a recording medium, and is a monocular 3D imaging device that can pick up a monocular 3D image and a 2D image.

As shown in FIG. 1, in the imaging device 10, an image-taking lens (image-taking optical system) 12, a strobe 1 and the like are provided on the front surface, and a shutter button 2, a power/mode switch 3, a mode dial 4 and the like are provided on the top surface. On the other hand, as shown in FIG. 2, a 3D liquid crystal monitor 30 for 3D display, a zoom button 5, a cross button 6, a MENU/OK button 7, a playback button 8, a BACK button 9 and the like are provided on the back surface of the camera.

The image-taking lens 12, which is constituted by a collapsible zoom lens, extends from the camera body, when the mode of the camera is set to an image-taking mode by the power/mode switch 3. The strobe 1 emits strobe light toward a main subject.

The shutter button 2 is configured as a two-step stroke type switch that allows for a so-called "half-push" and "full-push". When the imaging device 10 is driven as the image-taking mode, the AE/AF (automatic exposure adjustment/automatic focusing) is activated by performing the "half-push" of the shutter button 2, and an image taking is executed by performing the "full-push". Further, when the imaging device 10 is driven as the image-taking mode, an image taking is executed by performing the "full-push" of the shutter button 2.

The power/mode switch 3 has both of a function as a power switch for performing the ON/OFF of the power of the imaging device 10 and a function as a mode switch for setting the mode of the imaging device 10. The power/mode switch 3 is provided so as to be able to slide among an "OFF position", a "playback position" and an "image-taking position". In the imaging device 10, when the power/mode switch 3 is slid and placed to the "playback position" or the "image-taking position", the power is turned on, and when it is placed to the "OFF position", the power is turned off. Then, when the power/mode switch 3 is slid and placed to the "playback position", the "playback mode" is set, and when it is placed to the "image-taking position", the "image-taking mode" is set.

The mode dial 4 functions as an image-taking mode setting device for setting the image-taking mode of the imaging device 10. Depending on the setting position of this mode dial 4, the image-taking mode of the imaging device 10 is set to various modes. For example, there are a "plane image taking mode" for taking a plane image (2D image), a "stereoscopic image taking mode" for taking a stereoscopic image (3D image), a "moving image taking mode" for taking a moving image, and the like.

A 3D liquid crystal monitor 30 is a stereoscopic display device that can display a stereovision image (a left-eye image and a right-eye image) with a parallax barrier, as oriented images having predetermined orientations respectively. When a stereovision image is input to the 3D liquid crystal monitor 30, a parallax barrier having a pattern in which light transmitting parts and light blocking parts are alternately arrayed at a predetermined pitch is generated on a parallax barrier display layer of the 3D liquid crystal monitor 30, and strip-shaped image fragments showing the left and right pictures are alternately arranged and displayed on an image display surface of the lower layer. In the case of being utilized as a display panel for a plane image or a user interface, nothing is displayed on the parallax barrier display layer, and a single piece of image is displayed with no change on the image display surface of the lower layer. Note that the form of the 3D liquid crystal monitor 30 is not limited to this, and if displaying a left-eye image and a right-eye image such that they can be recognized as a stereoscopic image, it is allowable to be a form in which a lenticular lens is used, or a form in which the left-eye image and the right-eye image can be individually viewed by using dedicated glasses such as polarization glasses or liquid-crystal shutter glasses.

The zoom button 5 functions as a zoom instruction device for giving an instruction of the zoom, and includes a tele-button 5T for giving an instruction of the telescopic-side zoom and a wide-button 5W for giving an instruction of the wide-side zoom. In the imaging device 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (cursor-movement operation device) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the 3D liquid crystal monitor 30 and a function as an OK button for commanding the decision and execution of the selected content, or the like.

The playback button 8 is a button for the switching to the playback mode, in which a still image or moving image of a taken and recorded stereoscopic image (3D image) or plane image (2D image) is displayed on the 3D liquid crystal monitor 30.

The BACK button 9 functions as a button for giving an instruction of the cancel of an input operation or the restoration to the last operation state.

[Internal Configuration of Imaging Device]

Figure 3:
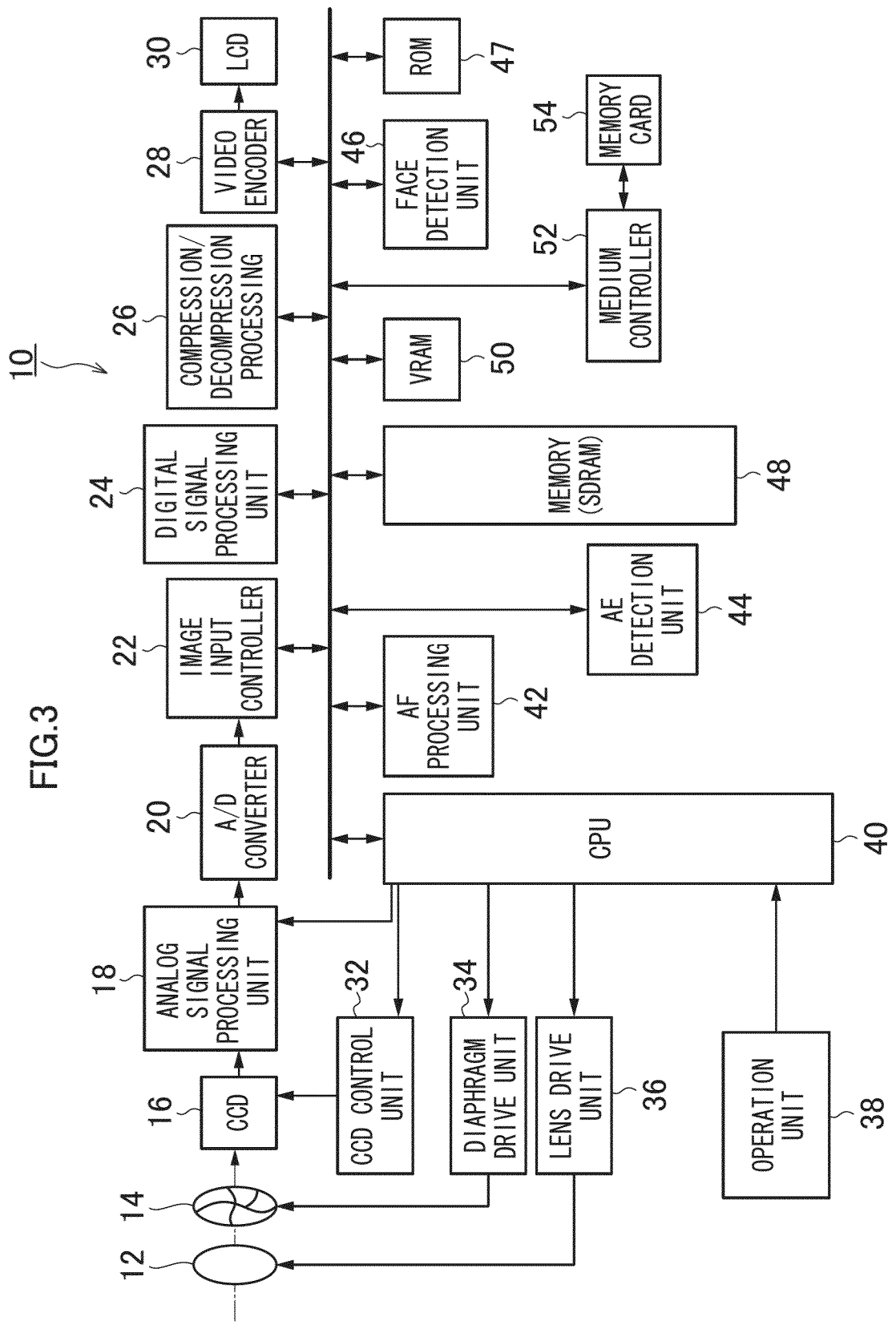
FIG. 3 is a block diagram showing an embodiment of the internal configuration of the imaging device shown in FIG. 1.

FIG. 3 is a block diagram showing an embodiment of the internal configuration of the above imaging device 10. The imaging device 10 records a picked-up image in a memory card 54, and the operation of the whole device is integrally controlled by a central processing unit (CPU) 40.

The imaging device 10 is provided with an operation unit 38 including the shutter button 2, the mode dial 4, the playback button 8, the MENU/OK button 7, the cross button 6, the zoom button 5 and the BACK button 9. A signal from the operation unit 38 is input to the CPU 40. Based on the input signal, the CPU 40 controls each circuit of the imaging device 10, and performs, for example, the lens drive control, the diaphragm drive control (the control of a diaphragm drive unit 34), the image-taking operation control (the control of a CCD control unit 32 and the like), the image processing control, the recording/playing control of image data, the display control of the 3D liquid crystal monitor (LCD) 30, and the like.

When the power of the imaging device 10 is turned on by the power/mode switch 3, a power unit, which is not shown in the figure, supplies electricity to each block, and the drive of the imaging device 10 starts.

The light flux having passed through the image-taking lens 12, a diaphragm 14 and the like forms an image on the imaging element 16 (imaging device, image acquisition device) that is a phase-difference image sensor, and signal charges are accumulated in the imaging element 16.

Here, the imaging element 16 can acquire a left-eye image and right-eye image (monocular 3D images) that are different in parallax depending on the defocus amount, and also, can acquire a 2D image by adding the left-eye image and the right-eye image. The detail of the imaging element 16 is described later. The imaging element 16 according to the embodiment is a CCD image sensor, but is not limited to this, and may be a CMOS (Complementary Metal Oxide Semiconductor) type image sensor.

The signal charges for the left-eye image and right-eye image accumulated in the imaging element 16 are read as a voltage signal corresponding to the signal charges, based on a reading signal to be given from a timing generator (not shown in the figure). The voltage signal read from the imaging element 16 is given to an analog signal processing unit 18.

The analog signal processing unit 18 performs, to the voltage signal output from the imaging element 16, a correlated double sampling process (a process for obtaining accurate pixel data by acquiring the difference between the level of feed through components and the level of pixel signal components contained in the output signal for each pixel of the imaging element 16, with the aim of reducing noises (particularly, thermal noises) and the like contained in the output signal of the imaging element 16). Thereby, the R (Red), G (Green) and B (Blue) signals for each pixel are sampled and held, and, after amplification, are given to an A/D converter 20. The A/D converter 20 sequentially converts the input R, G and B signals into R, G and B digital signals, and outputs them to an image input controller 22.

To the digital image signals input through the image input controller 22, a digital signal processing unit 24 performs predetermined signal processes such as an offset process, a white balance correction, a gain control process including a sensitivity correction, a gamma correction process, a synchronization process, a YC process and an edge enhancement process.

Further, the digital signal processing unit 24 includes a parallax acquisition device for acquiring the parallax between corresponding pixels of the left-eye image and the right-eye image, a parallax map acquisition device for creating a parallax map from the acquired parallax, a filtering processing device for altering both of the parallax amount and blur amount of the monocular 3D images in conjunction, from the acquired left-eye image and right-eye image (first monocular 3D images) and the acquired parallax map, and generating an intended left-eye image and right-eye image (second monocular 3D images). The detail of an image processing method for generating the intended second monocular 3D images from the first monocular 3D images acquired at the time of pickup is described later.

The 2D or 3D image data processed by the digital signal processing unit 24 are input to a VRAM (Video Random Access Memory) 50. The VRAM 50 includes an A region and a B region for recording image data each of which shows a 2D or 3D image for one frame. In the VRAM 50, the image data showing a 2D or 3D image for one frame are rewritten alternately in the A region and the B region. The written image data are read from the region other than a region in which image data are being rewritten, of the A region and B region in the VRAM 50.

The 2D or 3D image data read from the VRAM 50 are encoded in a video encoder 28, and then, are output to the 3D liquid crystal monitor 30 provided on the back surface of the camera. Thereby, 2D or 3D subject images are continuously displayed on the display screen of the 3D liquid crystal monitor 30.

When the first-step push (half-push) of the shutter button 2 of the operation unit 38 is performed, the imaging element 16 starts the AF operation and the AE operation, moves the focus lens of the image-taking lens 12 in the optical axis direction through the lens drive unit 36, and performs such a control that the focus lens comes to the focusing position.

The AF processing unit 42 is a part for performing a contrast AF process or a phase-difference AF process. In the case of performing the contrast AF process, for at least one image of the left-eye image and the right-eye image, high frequency components of the image in a predetermined focus region are extracted, and an AF evaluation value indicating a focusing state is calculated by integrating the high frequency components. The focus lens in the image-taking lens 12 is moved to such a lens position that the AF evaluation value is maximized, and thereby, the AF control (contrast AF) is performed.

In response to the zoom command from the zoom button 5, the CPU 40 advances or retreats the zoom lens of the image-taking lens 12 in the optical axis direction through the lens drive unit 36, and alters the focal length.

Further, at the time of the half-push of the shutter button 2, the image data output from the A/D converter 20 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject, from the integrated value input by the AE detection unit 44, and based on the image-taking Ev value, determines the F-value of the diaphragm 14 and the electronic shutter (shutter speed) of the imaging element 16, in accordance with a predetermined program chart.

Note that, in FIG. 3, reference numeral 46 designates a known face detection circuit for detecting the face of a person in an image-taking angular filed and setting an area containing the face as an AF area and an AE area (for example, Japanese Patent Application Laid-Open No. 9-101579).

Further, reference numeral 47 designates a ROM (Read Only Memory) or an EEPROM (Electronically Erasable and Programmable Read Only Memory) (digital filter storage device, transform filter storage device and inverse filter storage device) in which an image processing program for generating the second monocular 3D images according to the present invention, first and second semilunar filter groups (first and second digital filter groups) to be used for generating the second monocular 3D images, first and second transform filter groups for transforming the first monocular 3D images into the second monocular 3D images, first and second inverse filter groups that are inverse filters of the first and second semilunar filter groups, and the like are stored in addition to a camera control program, the defect information of the imaging element 16, and various parameters or tables to be used for image processes and the like. Note that the details of the image processing program, the filter groups and the like according to the present invention are described later.

When the AE operation and AF operation by the half-push of the shutter button 2 is finished and the second-step push (full-push) of the shutter button is performed, in response to the push, and that are output from the A/D converter 20 are input from the image input controller 22 to a memory (SDRAM: Synchronous Dynamic Random Access Memory) 48, and are temporarily stored.

The image data temporarily stored in the memory 48 are appropriately read by the digital signal processing unit 24, and here, predetermined signal processes including the demosaic process (synchronization process; a process of performing the interpolation for spatial deviations of color signals associated with the arrangement of primary color filters and transforming the color signals into a synchronous system), an image process for edge enhancement, and a YC process (a generation process of luminance data and color difference data of the image data) are performed. The image data (YC data) after the YC process are stored in the memory 48, again.

The YC data stored in the memory 48 are output to a compression/decompression processing unit 26, and, after the execution of a predetermined compression process such as JPEG (Joint Photographic Experts Group), are stored in the memory 48, again. From the YC data (compressed data) stored in the memory 48, an image file is generated. The image file is read by a medium controller 52, and is recorded in the recording medium (for example, a memory card) 54, which is detachable to the imaging device 10.

The imaging device 10 with the above configuration has an image processing function to generate intended 3D images (the second monocular 3D images) from picked-up 3D images (the first monocular 3D images), at the time of the pickup or playback of the 3D images. The other parts are the same as the conventional one.

[First and Second Digital Filter Groups (First and Second Semilunar Filter Groups)]

Next, the monocular 3D images and the first and second digital filter groups (the first and second semilunar filter groups) to which an image processing method according to the present invention is applied are explained with reference to FIG. 4 and FIG. 5.

Figure 4:
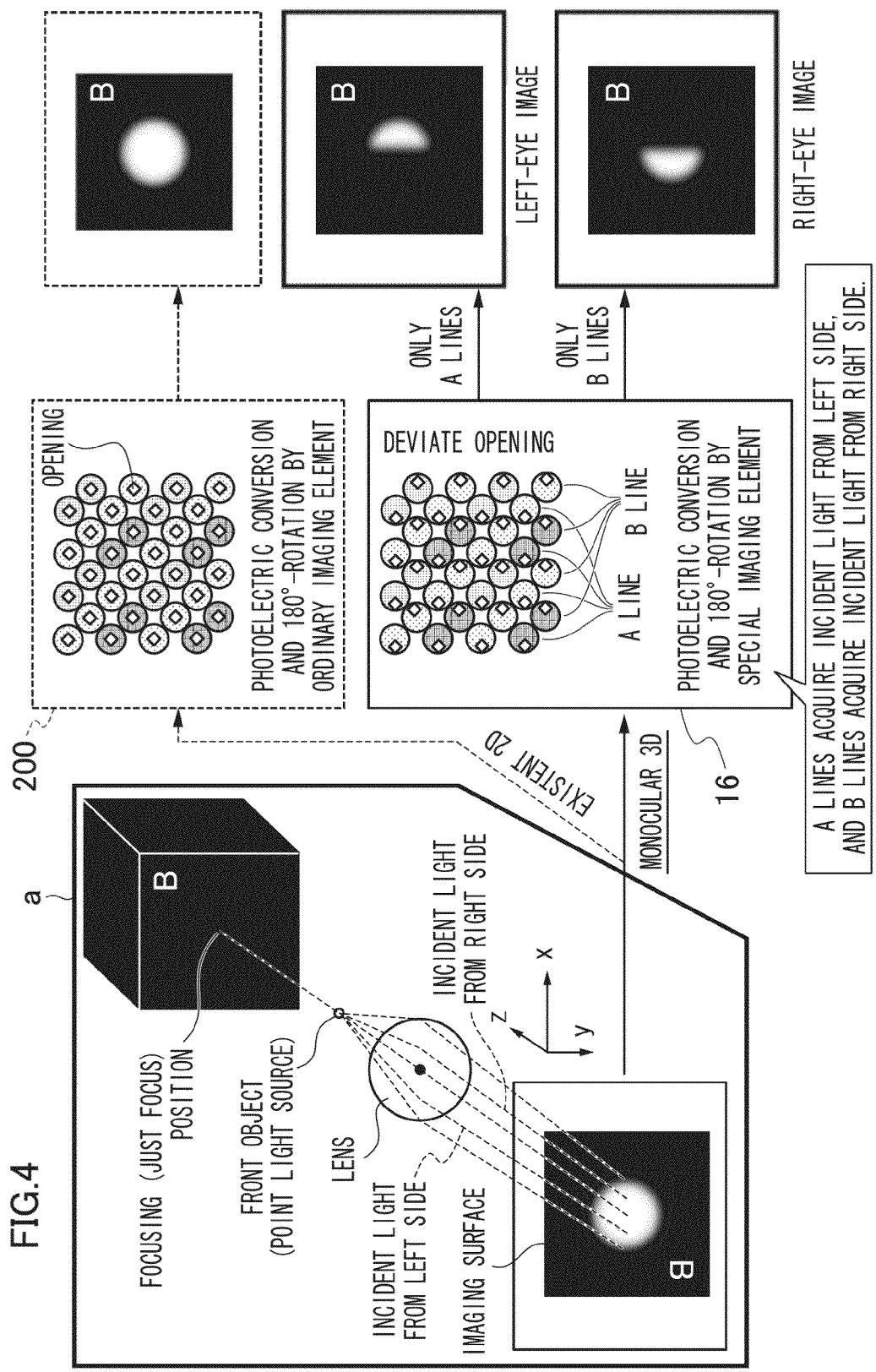
FIG. 4 is a diagram to be used for explaining an image that is picked up by an ordinary imaging element, and a left-eye image and right-eye image that are picked up by a monocular 3D imaging element.

FIG. 4 is a diagram showing how the image of an object (point light source) a in front of the focus position is taken, with the focus of a lens adjusted on the front surface of the object, and shows an image to be picked up by an ordinary imaging element 200, and a left-eye image and right-eye image to be picked up by a special imaging element (a monocular 3D imaging element) 16. Note that in the imaging elements 200 and 16 in FIG. 4, the light receiving surfaces viewed from the subject side are shown, respectively.

In the imaging element 200, pixels on odd lines (also referred to as main-pixels or A-plane pixels) and pixels on even lines (referred to as sub-pixels or B-plane pixels), each of which are arranged in a matrix, are disposed so as to be deviated from each other by one-half pitches in the horizontal and vertical directions. An image (A-plane image) composed of the A-plane pixels and an image (B-plane image) composed of the B-plane pixels each have color filters in the Bayer array. From these A-plane image and B-plane image, a single piece of high-resolution image can be generated. Note that openings to be entered by light, which are provided so as to correspond to the A-plane pixels and B-plane pixels of the imaging element 200, are formed at the centers of the respective pixels. Further, micro-lenses not shown in the figure are provided on the respective pixels.

The image of the point light source in front of the focus position that is obtained from the imaging element 200 involves a rear-focus, and forms a circle with a diameter equivalent to the blur amount.

On the other hand, in the imaging element 16, openings formed on the A-plane pixels and openings formed on the B-plane pixels are biased in the left and right directions, respectively. The light having passed through the left-side region of the lens enters the A-plane pixels, and the light having passed through the right-side region of the lens enters the B-plane pixels.

An image (A-plane image) composed of the A-plane pixels of the monocular 3D imaging element 16 having the above configuration is a left-eye image, and an image (B-plane image) composed of the B-plane pixels is a right-eye pixel.

The image of the point light source in front of the focus position that is obtained from the imaging element 16 involves a rear-focus, and the left-eye image and the right-eye image have semilunar shapes with diameters equivalent to the respective blur amounts. Then, the deviation amount between the centroid of the semilunar left-eye image and the centroid of the right-eye image is the parallax amount of the image of the point light source. That is, as for the image of the point light source in front of the focus position, if the characteristic (the sensitivity for each angle) of the imaging element 16 is already known, it is possible to know what left-eye and right-eye filters (the above-described first digital filter and second digital filter) are convoluted to the point light source. Note that the above first digital filter and second digital filter have semilunar shapes, and therefore, are referred to as the "first semilunar filter and second semilunar filter", hereinafter.

Figure 5A:
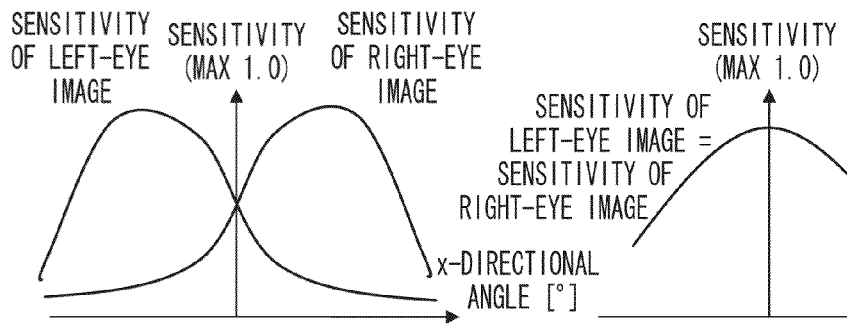
FIG. 5A is a diagram showing an example of the sensitivities of a left-eye image and right-eye image for the x-directional angle [°] of the light entering the monocular 3D imaging element.
Figure 5B:
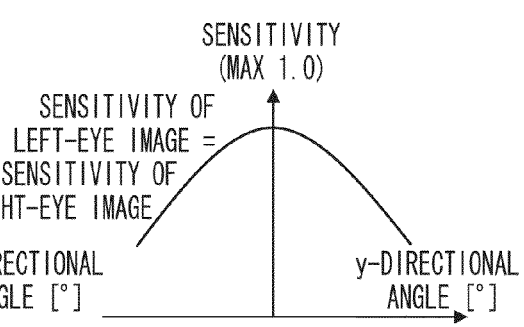
FIG. 5B is a diagram showing an example of the sensitivities of the left-eye image and right-eye image for the y-directional angle [°] of the light entering the monocular 3D imaging element.

Now, FIG. 4 shows an example of the sensitivities of the left-eye image and right-eye image for an x-directional angle [°] of the light that enters the monocular 3D imaging element 16 through the lens shown in FIG. 5A, and FIG. 5B shows an example of the sensitivities of the left-eye image and right-eye image for a y-directional angle [°].

As shown in FIG. 5A, the sensitivities of the left-eye image and right-eye image for the x-directional angle [°] have a rough symmetry centered on an angle of zero, and the peak positions of the sensitivities are deviated. Further, as shown in FIG. 5B, the sensitivities of the left-eye image and right-eye image for the y-directional angle [°] coincide, and the peak positions of the sensitivities are at an angle of zero.

Figure 5C:
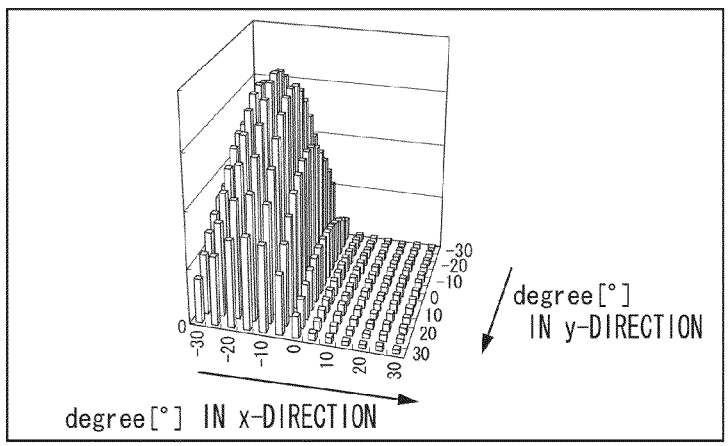
FIG. 5C is a diagram showing the sensitivity characteristic of an imaging element 16 corresponding to the left-eye image.

When combining the x-directional and y-directional sensitivity characteristics shown in FIG. 5A and FIG. 5B, the sensitivity characteristic for each of the x-directional and y-directional angles of the light entering the imaging element 16 is obtained as shown in FIG. 5C. Note that FIG. 5C shows the sensitivity characteristic corresponding to the left-eye image of the imaging element 16.

Figure 5D:
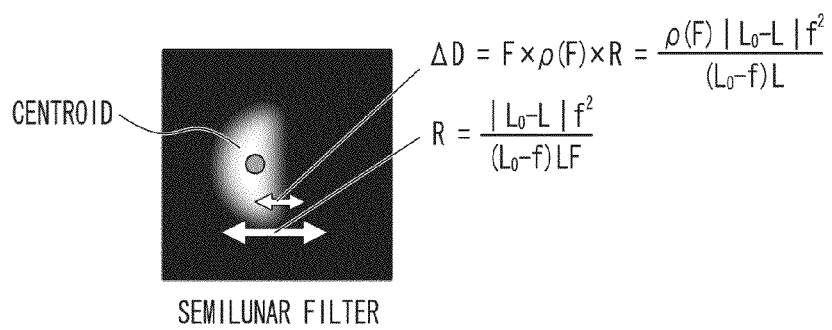
FIG. 5D is a diagram showing a semilunar filter to be created corresponding to the sensitivity characteristic of the monocular 3D imaging element.

Next, as shown in FIG. 5D, assuming that only a range with a certain diameter R on the imaging element 16 that corresponds to the blur amount of a point image is exposed to light, when the angles are converted into coordinates with respect to the x-axis (lateral direction) and y-axis (longitudinal direction) of the imaging element 16, the length between the centroids of the left and right semilunar filters (that is, the parallax $\Delta D$), and the diameter R of the semilunar filters can be expressed by the following formulas, respectively.

$$\Delta D = \frac{\rho(F)|L_o - L|f^2}{(L_o - f)L} \quad \text{[Formula 1]}$$

$$R = \frac{|L_o - L|f^2}{(L_o - f)LF} \quad \text{[Formula 2]}$$

Here, in [Formula 1] and [Formula 2], as shown in FIG. 6, f [mm] represents the actual focal length, F represents the diaphragm value, $L_O$ [mm] represents the focusing length to the focusing position, and L [mm] represents the length to a subject. Further, $\Delta D$ can be expressed as a predetermined ratio to R, using $\rho(F)$, which is a function in terms of F. Therefore, if $\Delta D$ is known, it is possible to know the value of R and the radius and distribution of a currently applied semilunar filter.

Figure 7:
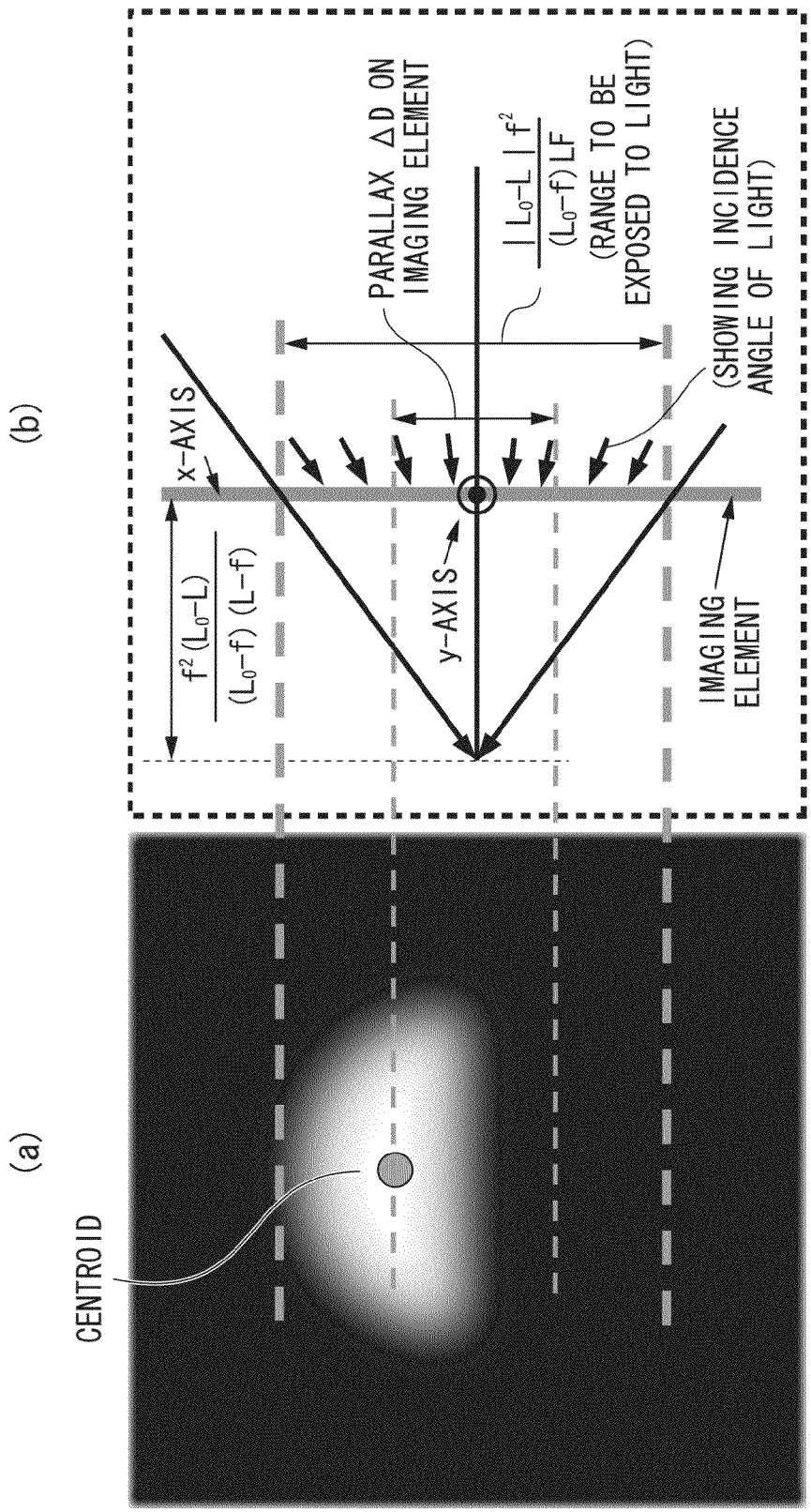
FIG. 7 is an enlarged view of the principal part of FIG. 6 and a diagram showing the semilunar filter.

The (a) portion and (b) portion of FIG. 7 are enlarged views of the semilunar filter and the vicinity of the imaging surface in FIG. 6, respectively. Note that the formulas shown in FIG. 6 and FIG. 7 can be derived from the lens equation and the geometric relation.

Figure 8:
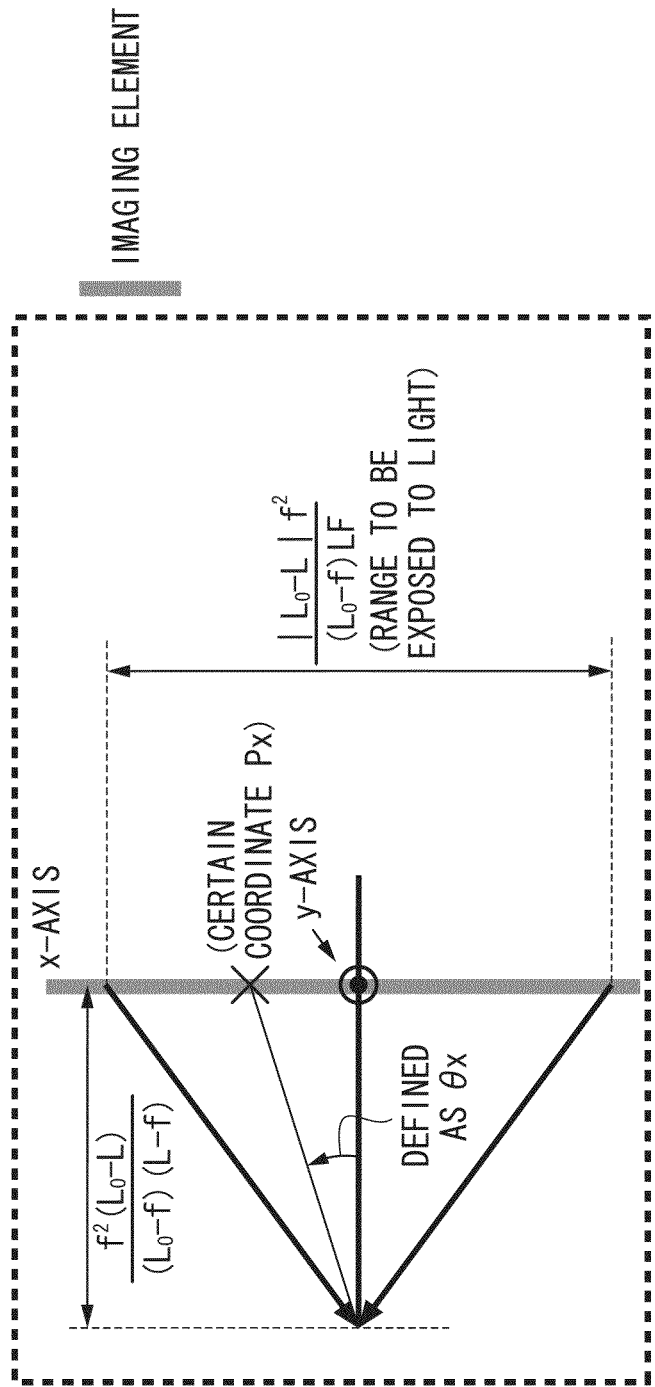
FIG. 8 is an enlarged view of the principal part of FIG. 6 and shows the relationship between the coordinate on the imaging element and the incidence angle.

Further, in the calculation of the filter coefficient of the semilunar filter, as shown in FIG. 8, when certain coordinates are (Px, Py) and the incidence angle of light to the coordinates (Px, Py) is ($\theta$x, $\theta$y), ($\theta$x, $\theta$y) shown in [Formula 4] is determined for (x, y) shown in the following [Formula 3].

$$x^2 + y^2 \leq \left( \frac{|L_o - L|f^2}{2(L_o - f)LF} \right)^2 \quad \text{[Formula 3]}$$

$$(\theta_x, \theta_y) = \left( \frac{180}{\pi} \tan^{-1}\left( \frac{2(L_o - f)(L - f)P_x}{f^2|L_o - L|} \right), \frac{180}{\pi} \tan^{-1}\left( \frac{2(L_o - f)(L - f)P_y}{f^2|L_o - L|} \right) \right) \quad \text{[Formula 4]}$$

Based on the incidence angle ($\theta$x, $\theta$y) determined by [Formula 4], the filter coefficient of the semilunar filter is calculated by substituting the sensitivity characteristic for each angle shown in FIG. 5C. On this occasion, it is preferable to divide each filter coefficient by the sum total of the filter coefficients, and thereby normalize the filter coefficient.

In the above way, the left and right semilunar filters are created for each parallax $\Delta D$, and are stored in the ROM (EEPROM) 47, in association with the parallax $\Delta D$. It is preferable that the creation of the semilunar filters be previously performed in the exterior and then the created semilunar filters be stored in the ROM 47. However, they may be created in the digital signal processing unit 24 to be stored in the ROM 47.

Further, in [Formula 1], the parallax $\Delta D$ is expressed as an absolute value, but between the parallax of a front object to the focusing length $L_O$ and the parallax of a depth-side object to the focusing length $L_O$, the parallax directions (signs) are opposite. Therefore, the left and right semilunar filters are created for each magnitude of the parallax and for each parallax direction, and stored in the ROM 47.

Figure 9A:
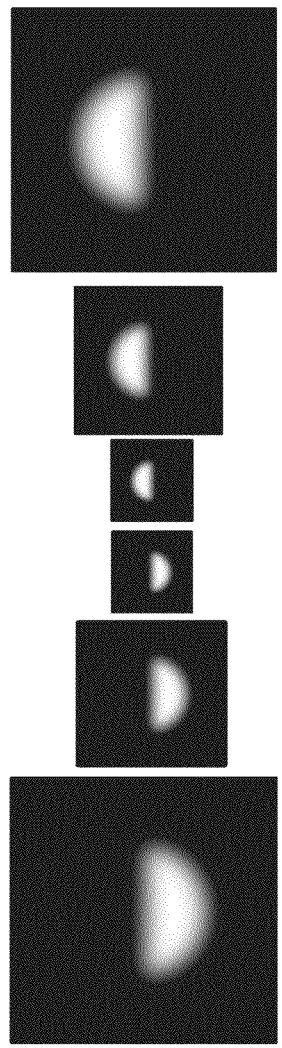
FIG. 9A is a diagram showing an example of first semilunar filters applied to left-eye images of an original monocular 3D image.
Figure 9B:
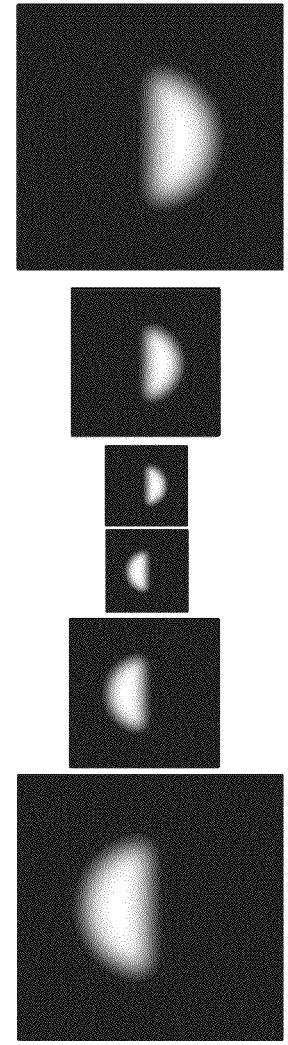
FIG. 9B is a diagram showing an example of second semilunar filters applied to right-eye images of the original monocular 3D image.

FIG. 9A and FIG. 9B show an example of the semilunar filters for each parallax $\Delta D$ (the first and second semilunar filter groups) that are respectively stored in the ROM 47 and that are respectively applied to the left-eye image and the right-eye image.

[Transform Filter]

Next, transform filters for transforming a left-eye image and right-eye image (the first monocular 3D images) that are picked up by the imaging device 10 and that have a parallax, into an intended left-eye image and right-eye image (the second monocular 3D images), are explained.

Figure 10:
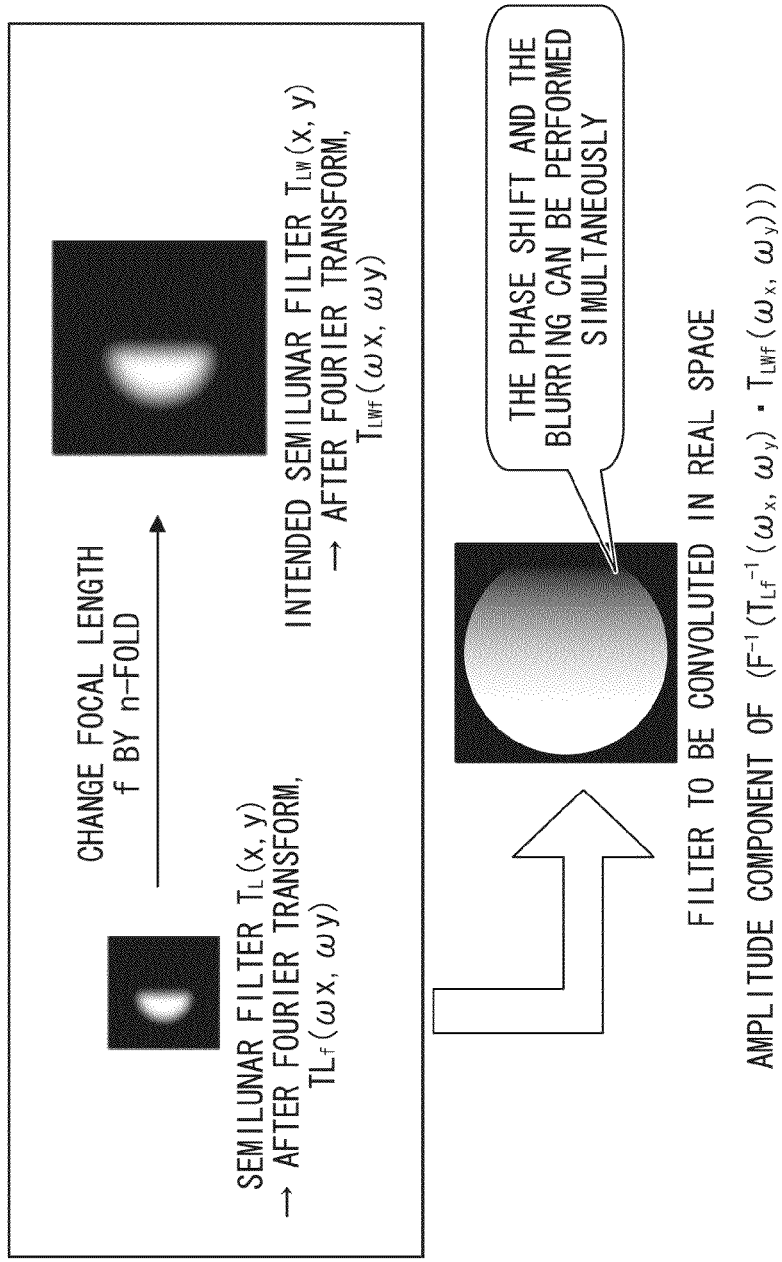
FIG. 10 is a diagram to be used for explaining a filter to be convoluted in real space when an intended monocular 3D image is generated.

As shown in FIG. 10, it is assumed that, when the focal length at the time of the pickup of the first monocular 3D images is f, the second monocular 3D images are obtained by the pickup with an image-taking lens at a focal length (n×f) that is n-fold of the focal length f.

Based on the semilunar filters (the first and second semilunar filters corresponding to the focal length f) previously stored in the ROM 47 and the focal length (n×f), semilunar filters that correspond to the second monocular 3D images (the third and fourth semilunar filters), and in which the parallax $\Delta D$ and diameter R shown in the above [Formula 1] and [Formula 2] are each increased by n-squared-fold, are calculated. That is, the third and fourth semilunar filters that have n-squared-fold similar shapes of the first and second semilunar filters are calculated.

Here, suppose that the first semilunar filter applied to the left-eye image of the first monocular 3D images is $T_L(x, y)$ and the first semilunar filter $T_L(x, y)$ to which the Fourier transform has been performed is $T_{Lf}(\omega_x, \omega_y)$, as shown in FIG. 10. On the other hand, suppose that the third semilunar filter to be applied to the left-eye image of the second monocular 3D images is $T_{LW}(x, y)$ and the third semilunar filter $T_{LW}(x, y)$ to which the Fourier transform has been performed is $T_{LWf}(\omega_x, \omega_y)$. In this case, a filter to be convoluted in real space (hereinafter, referred to as a "transform filter") is calculated for each pixel of the left-eye image with the parallax $\Delta D$, by the amplitude component of the following formula.

$$F^{-1}(T_{Lf}(\omega_x, \omega_y)^{-1} \cdot T_{LWf}(\omega_x, \omega_y)) \quad \text{[Formula 5]}$$

Here, $F^{-1}$: Fourier inverse transform

This transform filter (a first transform filter) is calculated corresponding to the first semilunar filter stored for each parallax. A second transform filter to be used for the transform into the right-eye image of the second monocular 3D images is also calculated in a similar way.

Here, it is preferable that first and second transform filter groups corresponding to the first and second semilunar filter groups be previously calculated depending on the parallax, when intended second monocular 3D images are determined.

Using the first and second transform filter groups calculated in such a way, the first monocular 3D images are transformed into the second monocular 3D images. That is, for each pixel of the left-eye image and right-eye image of the first monocular 3D images, the filtering process is performed using the first transform filter and second transform filter corresponding to the parallax $\Delta D$ for the pixel. Thereby, the second monocular 3D images in which both the parallax amount and the blur amount have been transformed in conjunction are generated for each parallax between pixels of the first monocular 3D images.

<Embodiments of Semilunar Filters to be Designed by the Present Invention>

There are various criteria about how to design the semilunar filters to be applied to intended second monocular 3D images depending on the semilunar filters applied to the first monocular 3D images. Embodiments shown below design semilunar filters comparable to the parallax amount and blur amount when changing the focal length by 2-fold, semilunar filters comparable to the parallax amount and blur amount when changing the F-value of the diaphragm to half, and semilunar filters comparable to the parallax amount and blur amount when changing the imaging element size by 1.5-fold.

[Semilunar Filters when Changing Focal Length by 2-Fold]

Figure 11A:
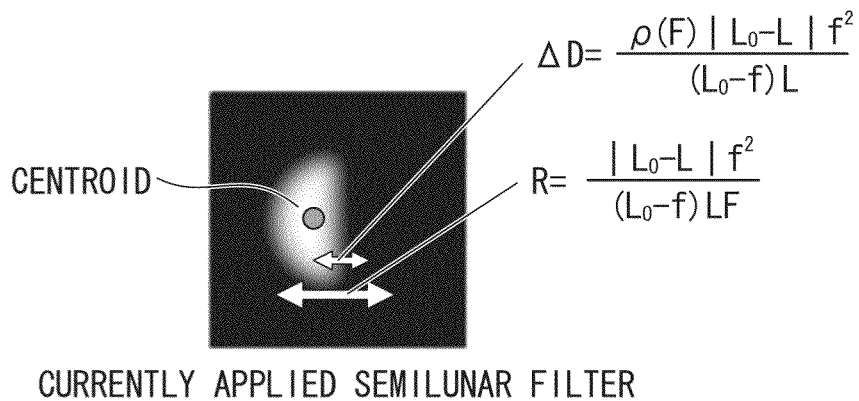
FIG. 11A is a diagram to be used for explaining an example of a semilunar filter to be applied to an intended monocular 3D image.
Figure 11B:
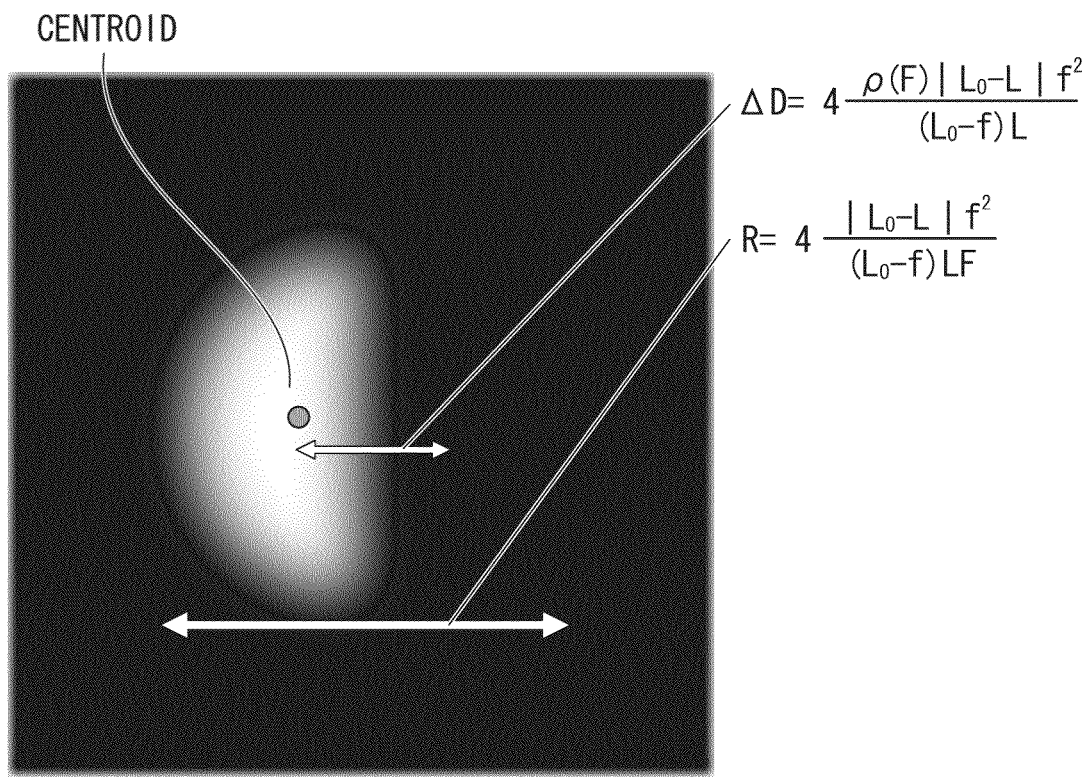
FIG. 11B is a diagram to be used for explaining an example of a semilunar filter to be applied to an intended monocular 3D image.

FIG. 11A shows a first semilunar filter applied to the left-eye pixel of the first monocular 3D images with a certain parallax ΔD, and FIG. 11B shows a third semilunar filter for the second monocular 3D images to be obtained when changing the focal length f of the image-taking lens by 2-fold, which corresponds to the above first semilunar filter.

As shown in FIG. 11B, the third semilunar filter is designed as a filter in which the parallax ΔD and the diameter R each are changed by 4-fold and that has a similar shape to the first semilunar filter. This is because, by substituting 2f into f in [Formula 1] and [Formula 2], the parallax ΔD and the diameter R each are changed by 4(=2×2)-fold.

Thereby, in the intended second monocular 3D images, the parallax ΔD is increased by 4-fold, and simultaneously, the blur amount (the diameter R) depending on the parallax is also increased by 4-fold.

[Semilunar Filters when Changing F-Value of Diaphragm to Half (½)]

Figure 12A:
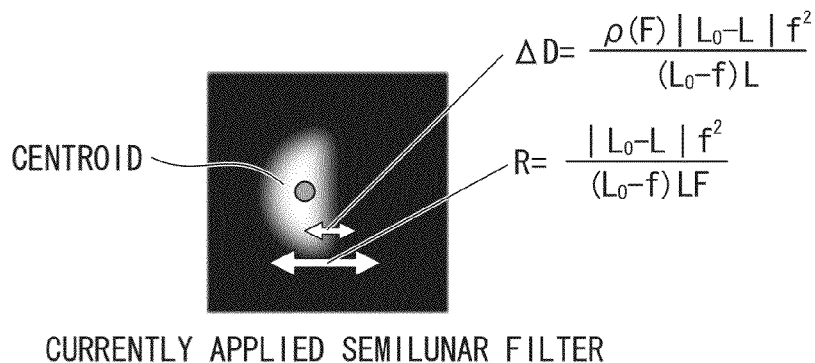
FIG. 12A is a diagram to be used for explaining an alternative example of a semilunar filter to be applied to an intended monocular 3D image.
Figure 12B:
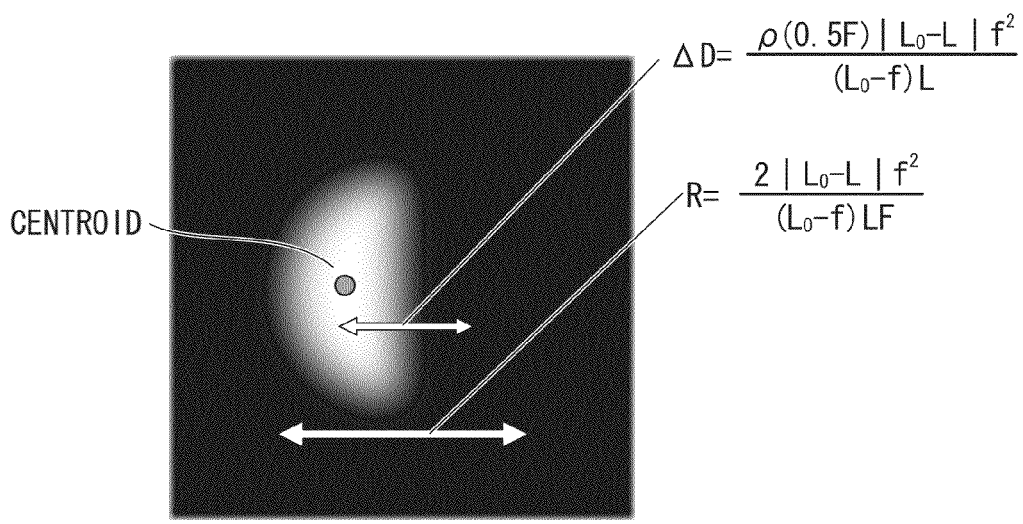
FIG. 12B is a diagram to be used for explaining an alternative example of a semilunar filter to be applied to an intended monocular 3D image.

FIG. 12A shows a first semilunar filter applied to the left-eye pixel of the first monocular 3D images with a certain parallax ΔD, and FIG. 12B shows a third semilunar filter for the second monocular 3D images to be obtained when changing the F-value of the diaphragm 14 to half, which corresponds to the above first semilunar filter.

As shown in FIG. 12B, in the third semilunar filter, the parallax ΔD, which is expressed by the function ρ(F) in terms of the F-value, is changed by ρ(0.5F)/ρ(F)-fold, and the diameter R is changed by 2-fold.

Thereby, in the intended second monocular 3D images, the parallax ΔD is increased by ρ(0.5F)/ρ(F)-fold, and simultaneously, the blur amount (the diameter R) depending on the parallax is increased by 2-fold.

[Semilunar Filters when Changing Image Element Size by 1.5-Fold]

Figure 13A:
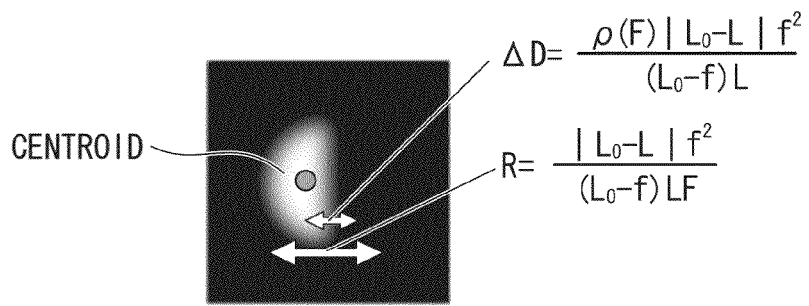
FIG. 13A is a diagram to be used for explaining a further alternative example of a semilunar filter to be applied to an intended monocular 3D image.
Figure 13B:
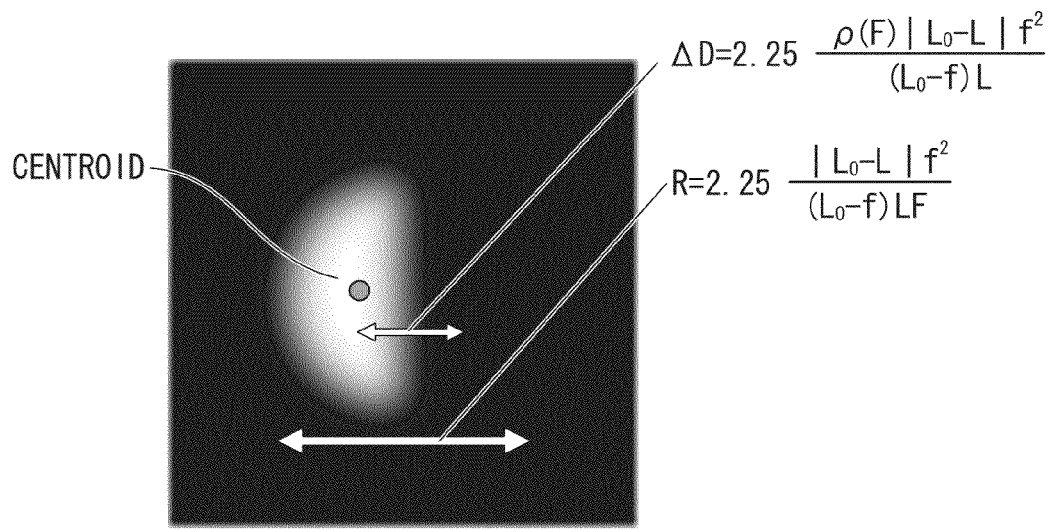
FIG. 13B is a diagram to be used for explaining a further alternative example of a semilunar filter to be applied to an intended monocular 3D image.

FIG. 13A shows a first semilunar filter applied to the left-eye pixel of the first monocular 3D images with a certain parallax ΔD, and FIG. 13B shows a third semilunar filter for the second monocular 3D images to be obtained when changing the imaging element size by 1.5-fold, which corresponds to the above first semilunar filter.

As shown in FIG. 13B, the third semilunar filter is designed as a filter in which the parallax ΔD and the diameter R each are changed by 2.25-fold and that has a similar shape to the first semilunar filter. A 1.5-fold change in the imaging element size is substantially comparable to a 1.5-fold change in the focal length f. Therefore, by substituting 1.5f into f in [Formula 1] and [Formula 2], the parallax ΔD and the diameter R each are changed by 2.25(=1.5×1.5)-fold.

Thereby, in the intended second monocular 3D images, the parallax ΔD is increased by 2.25-fold, and simultaneously, the blur amount (the diameter R) depending on the parallax is also increased by 2.25-fold.

[Specification Device of Intended Monocular 3D Images (Second Monocular 3D Images)]

Next, a specification device (a user interface) for specifying intended second monocular 3D images when the intended second monocular 3D images are generated from actually picked-up first monocular 3D images, is explained.

When intended second monocular 3D images are generated from actually picked-up first monocular 3D images at the time of the pickup or playback of the monocular 3D images, the MENU/OK button 7 or the like of the imaging device 10 is operated, and the function to generate the second monocular 3D images from the first monocular 3D images according to the present invention is selected on a menu setting screen of the 3D liquid crystal monitor 30.

Figure 14:
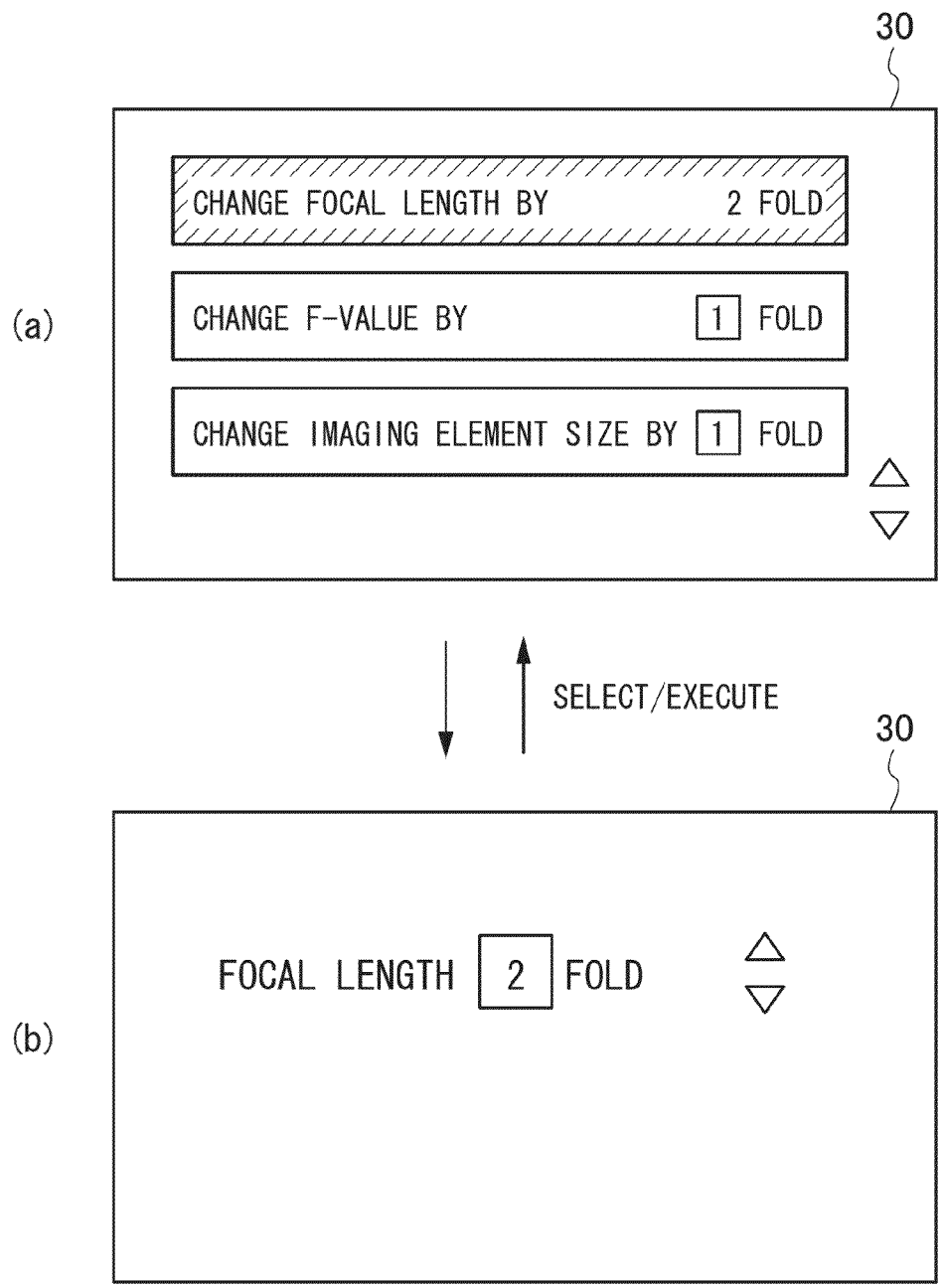
FIG. 14 is a diagram to be used for explaining a user interface for specifying an intended monocular 3D image.

By the selection of this function, the screen of the 3D liquid crystal monitor 30 is transited to a screen for selecting the focal length, the F-value and the imaging element size, as shown in the (a) portion of FIG. 14. Here, by operating the up and down keys of the cross button 6, it is possible to select any one of the focal length, the F-value and the imaging element size.

After the selection of any one of the focal length, the F-value and the imaging element size, the screen of the 3D liquid crystal monitor 30, by operating the MENU/OK button 7, is transited to a screen for setting the multiplying factor of the selected item as shown in the (b) portion of FIG. 14. Here, the (b) portion of FIG. 14 shows a screen for setting what fold focal length f is made from the focal length fat the time of the pickup of the first monocular 3D images.

When this screen is displayed, the up and down keys of the cross button 6 are operated, and the numeral is changed up and down. Thereby, an arbitrary multiplying factor can be selected. When the MENU/OK button 7 is operated after the selection of the multiplying factor, the selected multiplying factor is fixed, and the transition to the screen shown in the (a) portion of FIG. 14 is performed.

Thus, any one or multiple multiplying factors of the focal length, the F-value and the imaging element size are set, and thereby, it is possible to specify intended second monocular 3D images to be generated from the first monocular 3D images.

Here, the user interface for specifying intended second monocular 3D images is not limited to this embodiment, and a variety of user interfaces are possible. For example, in the case where the 3D liquid crystal monitor 30 has a touch panel to receive an instruction input by a touch operation, intended monocular 3D images may be specified by the operation with the touch panel.

<Image Processing Device>

Next, an image processing device (the digital signal processing unit 24, the CPU 40 and the ROM 47 are mainly comparable to this) to generate intended second monocular 3D images from original first monocular 3D images picked-up by the imaging device 10, or from original first monocular 3D images read from the memory card 54, is explained.

A first embodiment to a third embodiment shown below are the same as each other in the second monocular 3D images to be generated from the first monocular 3D images, but are different in the type of previously stored filters and the operation content.

First Embodiment

Figure 15:
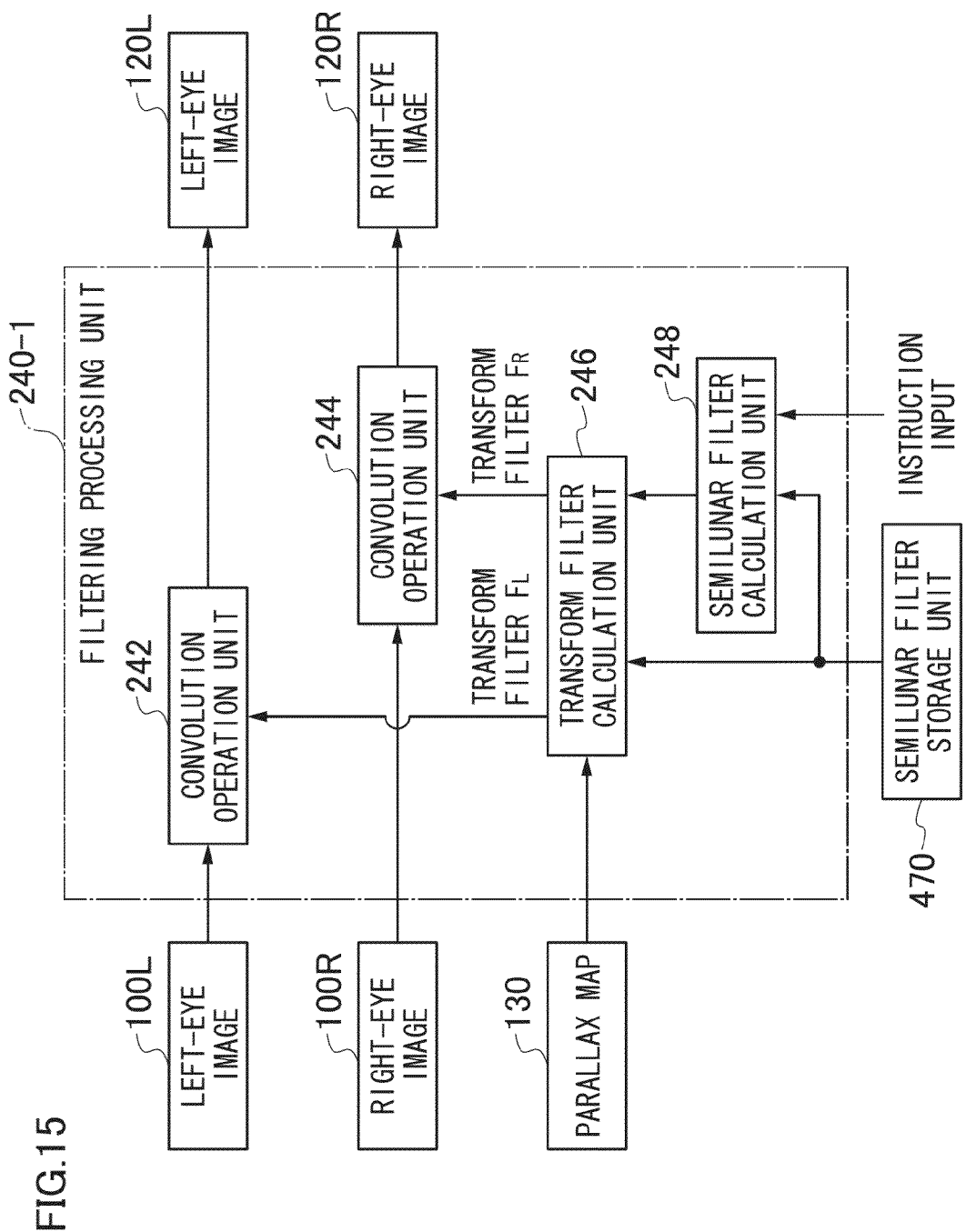
FIG. 15 is a principal part block diagram showing a first embodiment of an image processing device according to the present invention.

FIG. 15 is a principal part block diagram showing a first embodiment of an image processing device according to the present invention.

In FIG. 15, the digital signal processing unit 24 of the imaging device 10 has a filtering processing unit 240-1. The filtering processing unit 240-1 includes convolution operation units 242, 244, a transform filter calculation unit 246 and a semilunar filter calculation unit 248.

A left-eye image 100L and a right-eye image 100R of original first monocular 3D images are given to the convolution operation units 242, 244, respectively. To the other inputs of the convolution operation units 242, 244, a first transform filter $F_L$ and a second transform filter $F_R$ calculated by the transform filter calculation unit 246 are given. By performing the convolution operation of the two inputs, the convolution operation units 242, 244 respectively generate two corresponding pixels of a left-eye image 120L and right-eye image 120B of intended second monocular 3D images, in which the parallax amount and blurring amount for two corresponding pixels of the left-eye image 100L and right-eye image 100R have been altered in conjunction.

Here, as shown below, the transform filter calculation unit 246 calculates the parallax amount for the two corresponding pixels of the left-eye image 100L and right-eye image 100R, and the first transform filter $F_L$ and second transform filter $F_R$ corresponding to semilunar filters designed to be applied to the second monocular 3D images, and then, outputs them to the convolution operation units 242, 244.

The CPU 40 calculates the deviation (parallax) of the pixels between corresponding points of the left-eye image 100L and right-eye image 100R of the original first monocular 3D images, in the whole screen, and creates a parallax map 130 that indicates the parallax depending on the position in the screen.

As the corresponding points (feature points) of the left-eye image 100L and right-eye image 100R, it is preferable to adopt all the points that can uniquely specify the features between the images of the left-eye image 100L and the right-eye image 100R.

For the detection of the feature points at which the features coincide between the images of the left-eye image 100L and the right-eye image 100R, for example, a block matching method can be applied. In the block matching method, the degree of coincidence between a block with a predetermined block size that is cut out with reference to an arbitrary pixel from one image (the left-eye image 100L) of the left-eye image 100L and right-eye image 100R and a block in the other image (the right-eye image 100R) is evaluated, and then, a reference pixel of the block in the right-eye image 100R that maximizes the degree of coincidence between the blocks is set as the pixel of the right-eye image 100R corresponding to the arbitrary pixel of the left-eye image 100L.

As the function for evaluating the degree of coincidence between the blocks in the block matching method, there is a function that uses the sum of squares (SSD) of the luminance difference between pixels in the blocks (the SSD block matching method), for example.

Then, the position of the pixel of the right-eye image 100R and the parallax for the corresponding pixel of the right-eye image 100R, which indicates the deviation amount and deviation direction between the pixels (the deviation direction can be expressed as positive or negative), are determined, and thereby, the parallax map 130 can be created. Here, the creation of the parallax map 130 may be performed in the digital signal processing unit 24.

A semilunar filter storage unit 470 is a part that stores the first semilunar filter and second semilunar filter depending on the parallax (the first and second semilunar filter groups shown in FIG. 9A, FIG. 9B and the like) applied to the original left-eye image 100L and right-eye image 100R, and corresponds to a part of the storage unit of the ROM 47.

To the semilunar filter calculation unit 248, which calculates the third and fourth semilunar filter groups to be applied to the left-eye image 120L and right-eye image 120R of the intended second monocular 3D images, the first and second semilunar filter groups are input from the semilunar filter storage unit 470, and therewith, the information (the multiplying factor of the focal length f, F-value or imaging element size of the second monocular 3D images, relative to the focal length f, F-value or imaging element size at the time of the pickup of the first monocular 3D images) corresponding to the transform characteristic for the intended second monocular 3D images that is specified by the user interface including the operation unit 38 is input. Based on the input first and second semilunar filter groups and the input information relevant to the transform characteristic for the second monocular 3D images, the third and fourth semilunar filter groups are calculated (see FIG. 11A to FIG. 13B).

The transform filter calculation unit 246 calculates the first and second transform filters for each parallax ΔD by the above-described [Formula 5], based on the first and second semilunar filter groups input from the semilunar filter storage unit 470 and the third and fourth filter groups calculated by the semilunar filter calculation unit 248. Here, it is preferable that the calculated first and second transform filters for each parallax ΔD (the first and second transform filter groups) be temporarily stored in an internal memory not shown in the figure.

The transform filter calculation unit 246 acquires the parallax between an arbitrary pixel of the left-eye image 100L and a pixel of the right-eye image 100R corresponding to the pixel, from the parallax map 130, and acquires the first and second transform filters corresponding to the acquired parallax, from the previously calculated and stored first and second transform filter groups, to output the first and second transform filters to the convolution operation units 242, 244, respectively.

The convolution operation unit 242, with reference to the arbitrary pixel of the left-eye image 100L, performs the convolution operation between multiple pixels having the same kernel size as the first transform filter and the first transform filter, and thereby, calculates the pixel on the left-eye image 120L corresponding to the arbitrary pixel. Similarly, the convolution operation unit 244, with reference to the corresponding pixel of the right-eye image 100R corresponding to the arbitrary pixel of the left-eye image 100L, performs the convolution operation between multiple pixels having the same kernel size as the second transform filter and the second transform filter, and thereby, calculates the pixel on the left-eye image 120L for the corresponding pixel of the right-eye image 100R.

The above filtering process is performed for all corresponding pixels of the left-eye image 100L and right-eye image 100R of the original first monocular 3D images, and thereby, it is possible to generate the left-eye image 120L and right-eye image 120R of the second monocular 3D images.

Second Embodiment

Figure 16:
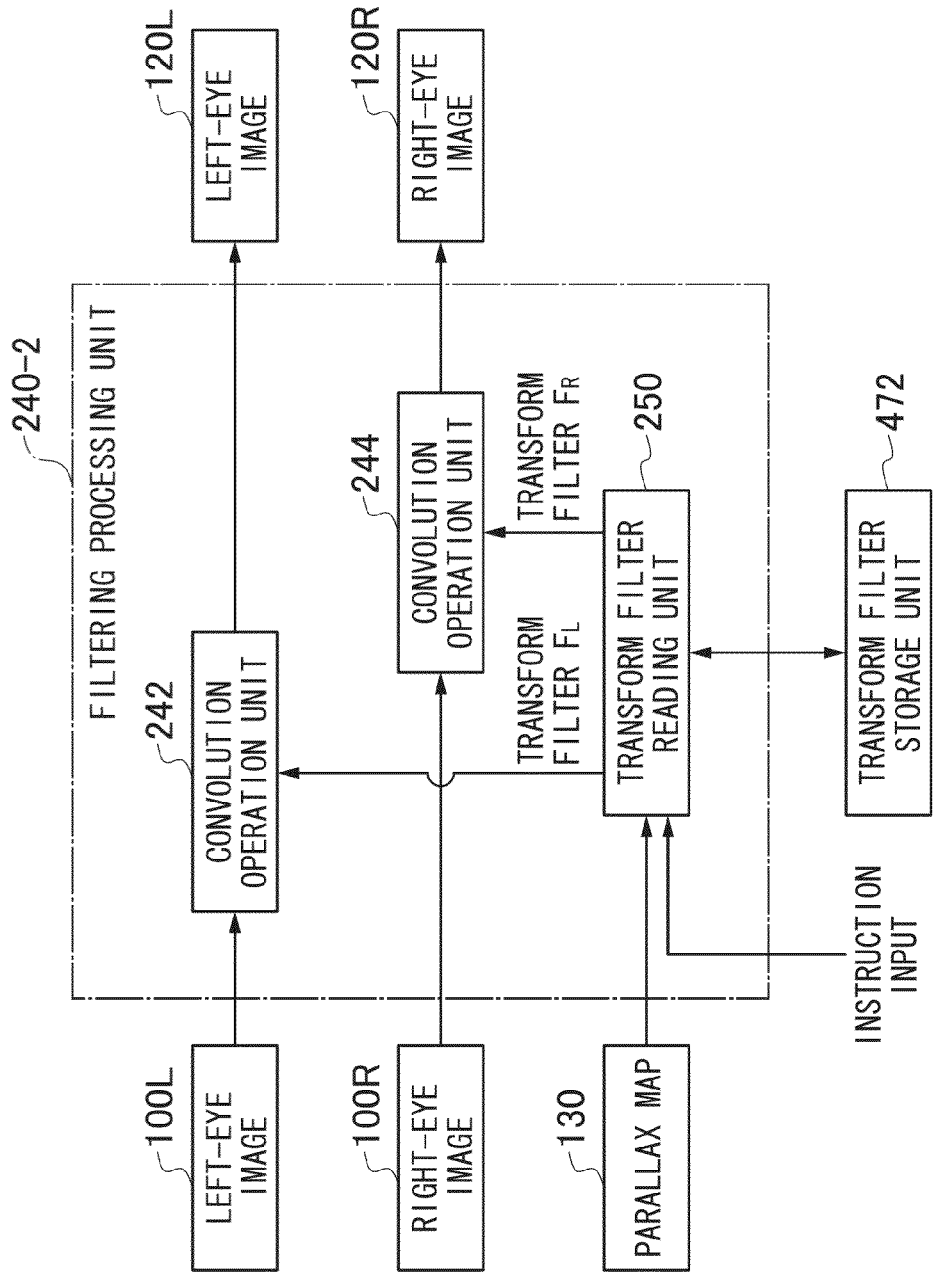
FIG. 16 is a principal part block diagram showing a second embodiment of the image processing device according to the present invention.

FIG. 16 is a principal part block diagram showing a second embodiment of the image processing device according to the present invention.

Here, in FIG. 16, the same reference numerals are assigned to common parts with FIG. 15, and the detailed explanation thereof is omitted.

In FIG. 16, the digital signal processing unit 24 of the imaging device 10 has a filtering processing unit 240-2. The filtering processing unit 240-2 includes convolution operation units 242, 244 and a transform filter reading unit 250.

A transform filter storage unit 472 is a part that stores the first and second transform filter groups identical to the first and second transform filter groups to be calculated by the transform filter calculation unit 246 according to the first embodiment, and corresponds to a part of the storage unit of the ROM 47. It is preferable that the transform filter storage unit 472 previously store multiple kinds (multiple kinds for each information corresponding to the transform characteristic for the intended second monocular 3D images that can be specified by the user interface) of first and second transform filter groups. Further, the first and second transform filter groups can be calculated by an external apparatus or the like comparable to the transform filter calculation unit 246 according to the first embodiment, and the calculation result can be stored in the transform filter storage unit 472.

To the transform filter reading unit 250, which reads appropriate first and second transform filters $F_L$, $F_R$ from the transform filter storage unit 472 and outputs them to the convolution operation units 242, 244 respectively, the information corresponding to the transform characteristic for the intended second monocular 3D images that is specified by the user interface including the operation unit 38 is input, and therewith, the parallax is input from the parallax map 130.

The transform filter reading unit 250 determines the first and second filter groups to be used, from the multiple kinds of first and second transform filter groups stored in the transform filter storage unit 472, based on the information corresponding to the transform characteristic for the intended second monocular 3D images. Meanwhile, the parallax between an arbitrary pixel of the left-eye image 100L and a pixel of the right-eye image 100R corresponding to the pixel is acquired from the parallax map 130, the first and second transform filters corresponding to the acquired parallax are read from the determined first and second filter groups, and then, the read first and second transform filters are output to the convolution operation units 242, 244, respectively.

According to the second embodiment, since the multiple kinds of first and second transform filter groups are previously stored in the transform filter storage unit 472, the operation process for calculating the first and second transform filter groups can be omitted, but the transform filter storage unit 472 needs to have a large storage capacity.

Third Embodiment

Figure 17:
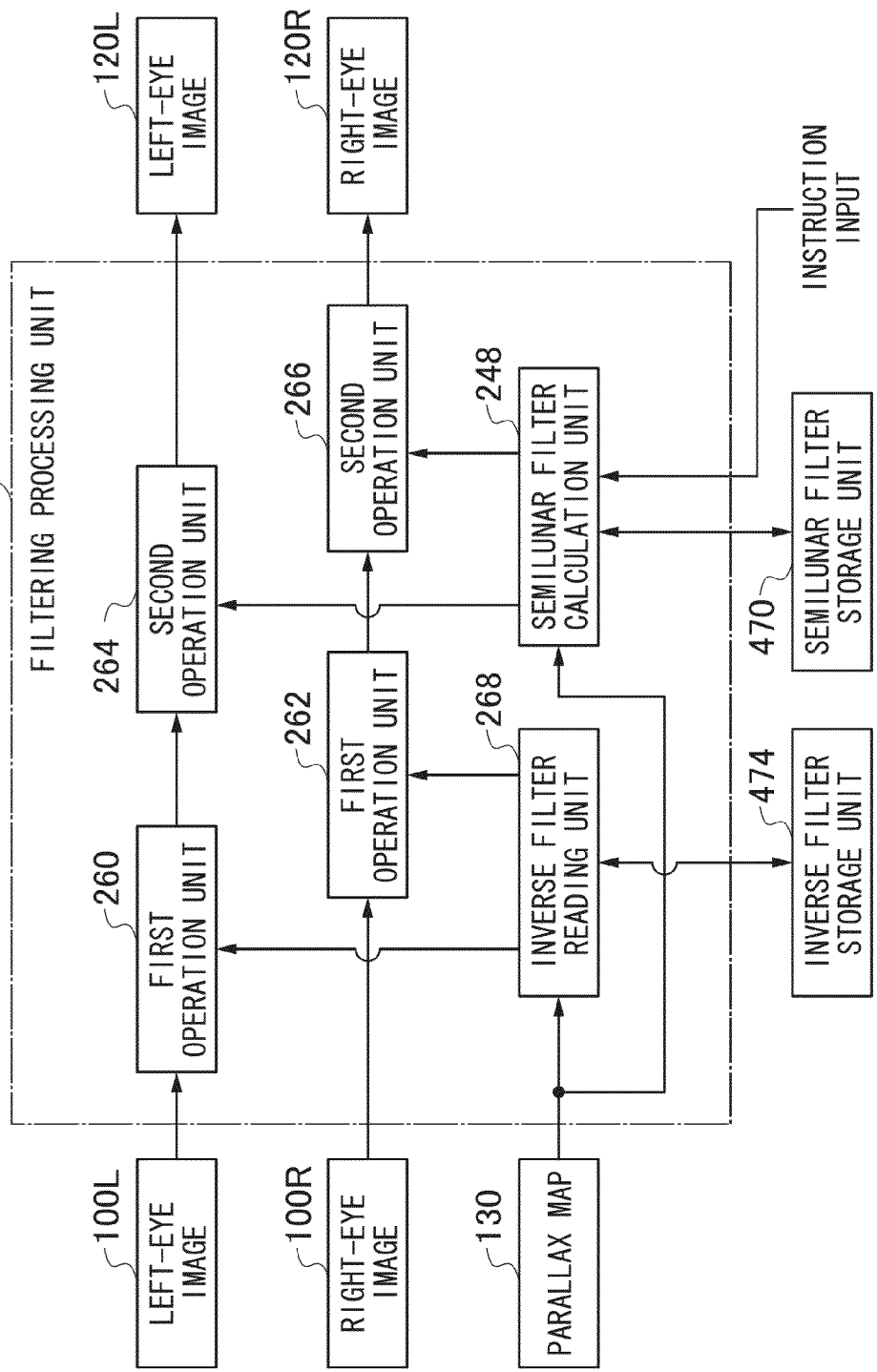
FIG. 17 is a principal part block diagram showing a third embodiment of the image processing device according to the present invention.

FIG. 17 is a principal part block diagram showing a third embodiment of the image processing device according to the present invention.

Here, in FIG. 17, the same reference numerals are assigned to common parts with FIG. 15, and the detailed explanation thereof is omitted.

In FIG. 17, the digital signal processing unit 24 of the imaging device 10 has a filtering processing unit 240-3. The filtering processing unit 240-3 includes first operation units 260, 262 and second operation units 264, 266 to perform convolution operations, an inverse filter reading unit 268, and a semilunar filter calculation unit 248.

As shown in [Formula 5], the transform filter has a filter coefficient of the amplitude component of $F^{-1}(T_{Lf}(\omega_x, \omega_y)^{-1} \cdot T_{LWf}(\omega_x, \omega_y))$. The filtering process by the transform filter can be divided into a convolution operation by $F^{-1}(T_{Lf}(\omega_x, \omega_y)^{-1})$ and a convolution operation by $F^{-1}(T_{LWf}(\omega_x, \omega_y))$.

The former $F^{-1}(T_{Lf}(\omega_x, \omega_y)^{-1})$ is the inverse filter of the first semilunar filter, and the latter $F^{-1}(T_{LWf}(\omega_x, \omega_y))$ is the third semilunar filter.

In the third embodiment, for each corresponding pixel of the left-eye image 100L and right-eye image 100R, a first operation to apply first and second inverse filters depending on the parallax is performed, and a second operation to apply the third and fourth semilunar filters to the operation results is performed. The first operation means the generation of blur-cancelled images in which the parallax and blur of the original first monocular 3D images have been cancelled, and the second operation means the generation of the left-eye image 120L and right-eye image 120R by applying the third and fourth semilunar filters for each parallax, which correspond to the transform characteristic by which the light entering the image-taking lens 12 is transformed into the intended second monocular 3D images, to the blur-cancelled images.

An inverse filter storage unit 474 is a part that stores the first and second inverse filter groups calculated from the first and second semilunar filter groups, which are stored in the semilunar filter storage unit 470, and corresponds to a part of the storage unit of the ROM 47. The first and second inverse filter groups can be calculated from the first and second semilunar filter groups, by an external apparatus or the like, and the calculation result can be stored in the inverse filter storage unit 474.

The inverse filter reading unit 268 acquires the parallax between an arbitrary pixel of the left-eye image 100L and a pixel of the right-eye image 100R corresponding to the pixel, from the parallax map 130, reads the first and second inverse filters that are the inverse filters of the first and second semilunar filters corresponding to the acquired parallax, from the inverse filter storage unit 474, and then, outputs them to the first operation units 260, 262, respectively.

The first operation unit 260, with reference to the arbitrary pixel of the left-eye image 100L, performs the convolution operation between multiple pixels having the same kernel size as the first inverse filter and the first inverse filter. Similarly, the second operation unit 262, with reference to the corresponding pixel of the right-eye image 100R corresponding to the arbitrary pixel of the left-eye image 100L, performs the convolution operation between multiple pixels having the same kernel size as the second inverse filter and the second inverse filter. These operation results (blur-cancelled images in which the blur and the like have been cancelled) are output to the second operation units 264, 266, respectively.

To the other inputs of the second operation units 264, 266, the third and fourth semilunar filters corresponding to the current parallax obtained from the parallax map 130, which are of the third and fourth semilunar filter groups calculated by the semilunar filter calculation unit 248, are given. The second operation units 264, 266 perform the convolution operation between the blur-cancelled images calculated by the first operation units 260, 262 and the third and fourth semilunar filters, and thereby, calculate each pixel on the left-eye image 120L and right-eye image 120R.

According to the third embodiment, unlike the first embodiment, the calculation of the first and second transform filter groups is unnecessary, allowing for the speed-up of the operation process. Further, the third embodiment, which requires storing the first and second inverse filter groups, can reduce the storage capacity of the inverse filter storage unit 474, compared to the second embodiment, which requires storing the multiple kinds of first and second transform filter groups.

Here, the blur-cancelled images to be calculated by the first operation units 260, 262 are identical. Therefore, it is preferable to generate the blur-cancelled image using only any one of the left-eye image 100L and the right-eye image 100R, and to output the generated blur-cancelled image to the second operation units 264, 266, respectively.

[Alternative Embodiments of Third and Fourth Semilunar Filters]

In the embodiments shown in FIG. 11A to FIG. 13B, the first and second semilunar filters applied to the first monocular 3D images are scaled so as to have similar shapes, and thereby, the third and fourth semilunar filters corresponding to intended second monocular 3D images are designed. However, the third and fourth semilunar filters can be designed independently of the first and second semilunar filters.

Figure 18A:
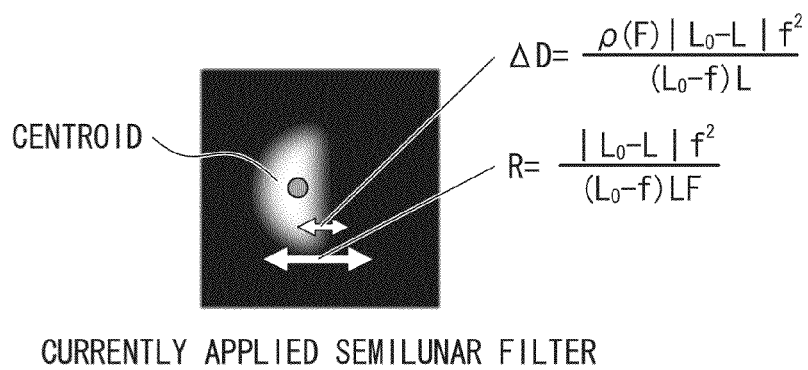
FIG. 18A is a diagram to be used for explaining a further alternative example of a semilunar filter to be applied to an intended monocular 3D image.
Figure 18B:
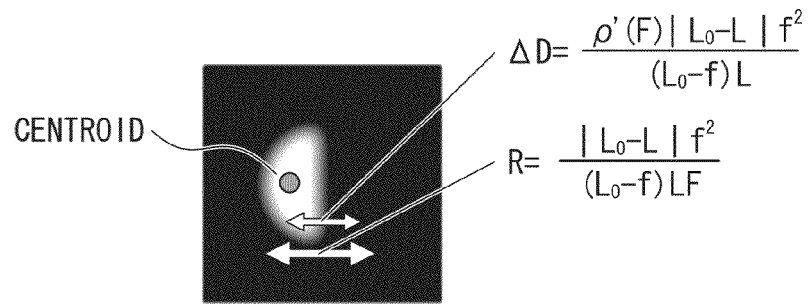
FIG. 18B is a diagram to be used for explaining a further alternative example of a semilunar filter to be applied to an intended monocular 3D image.

FIG. 18A shows a first semilunar filter applied to a left-eye pixel of first monocular 3D images with a certain parallax ΔD, and FIG. 18B shows a third semilunar filter corresponding to the first semilunar filter, for second monocular 3D images to be obtained when the sensitivity characteristic of the monocular 3D imaging element is changed.

As shown in FIG. 18B, the third semilunar filter do not change the blur amount (the diameter R), but changes the function ρ(F) in terms of F, into a function ρ'(F), in order to deal with the imaging element having a different sensitivity characteristic. As a result, the third semilunar filter can give a different parallax ΔD from the first semilunar filter, even when the blur amount (the diameter R) is the same.

Further, as the imaging element having a different sensitivity characteristic, an ideal imaging element can be assumed. For example, although the sensitivity characteristics of the left-eye image and right-eye image shown in FIG. 5A produce a crosstalk depending on the incidence angle, it is possible to design third and fourth semilunar filters corresponding to an imaging element that has a sensitivity characteristic with no crosstalk.

Figure 19:
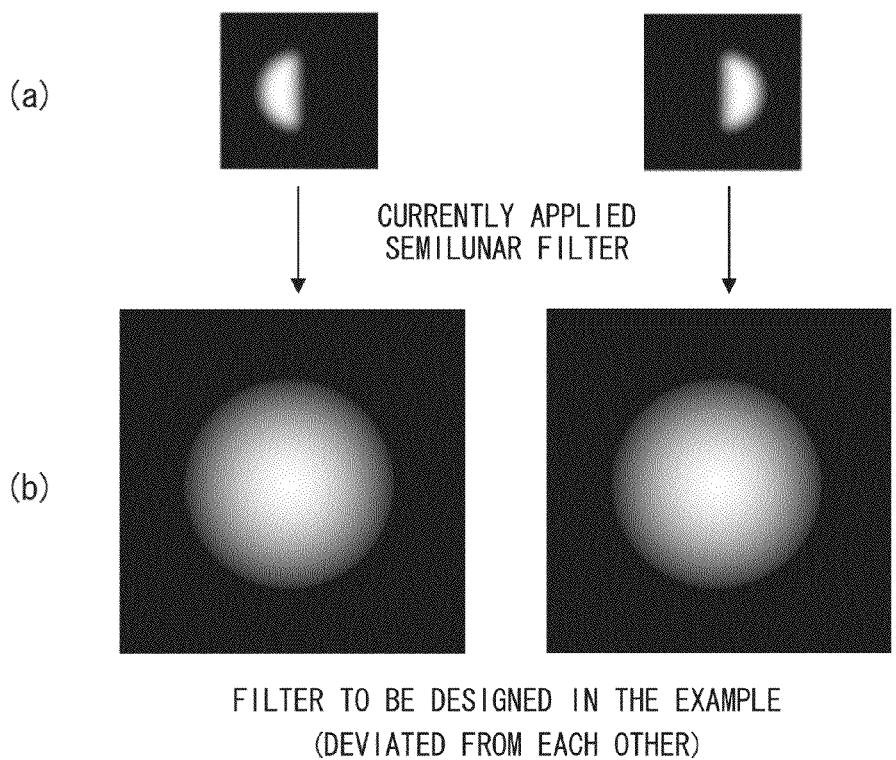
FIG. 19 is a diagram to be used for explaining a further alternative example of a filter to be applied to an intended monocular 3D image.

The (a) portion of FIG. 19 shows each of first and second semilunar filters applied to a left-eye pixel of first monocular 3D images with a certain parallax ΔD, and the (b) portion of FIG. 19 shows each of third and fourth filters corresponding to the first and second semilunar filters.

In the embodiments shown in FIG. 11A and FIG. 11B, FIG. 12A and FIG. 12B, FIG. 13A and FIG. 13B, and FIG. 18A and FIG. 18B, semilunar filters are adopted as the targeted filters, for avoiding a double image appearance. However, when the corresponding between pixels is difficult for human eyes (the stereovision is difficult), for example, when the blur is large, it is preferable to prioritize a natural view for human eyes, over the avoidance of a double image appearance.

The third and fourth filters shown in the (b) portion of FIG. 19 each have circular shapes, and have point-symmetric filter coefficients in which the filter coefficient is maximized at the center.

As shown in the (b) portion of FIG. 19, when circular third and fourth filters are adopted as the targeted filters, it is possible to circularize the blur, and to generate images allowing for a natural stereovision, for example, even when the aperture of the blur is large. Here, the calculation method and the like are the same as the case where the targeted filters are semilunar filters.

[Technique for Generating Multiple Second Monocular 3D Images from Single First Monocular 3D Image]

Next, an embodiment when multiple second monocular 3D images are generated from a single original first monocular 3D image is explained.

Figure 20A:
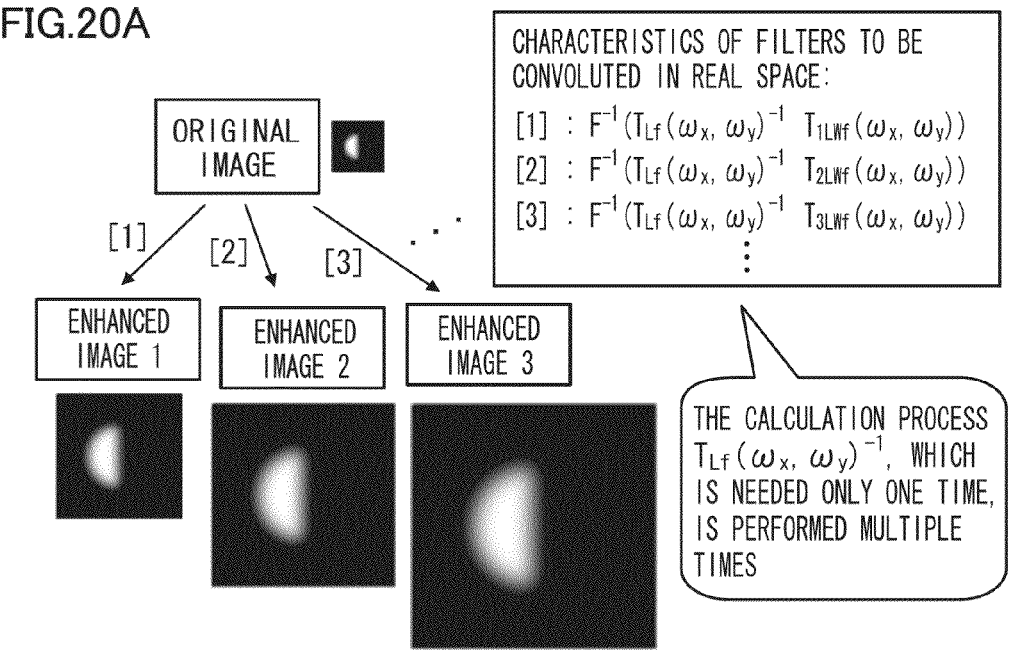
FIG. 20A is a conceptual diagram showing an ordinary process and a calculation-time shortening process when multiple second monocular 3D images are generated from a first monocular 3D image.
Figure 20B:
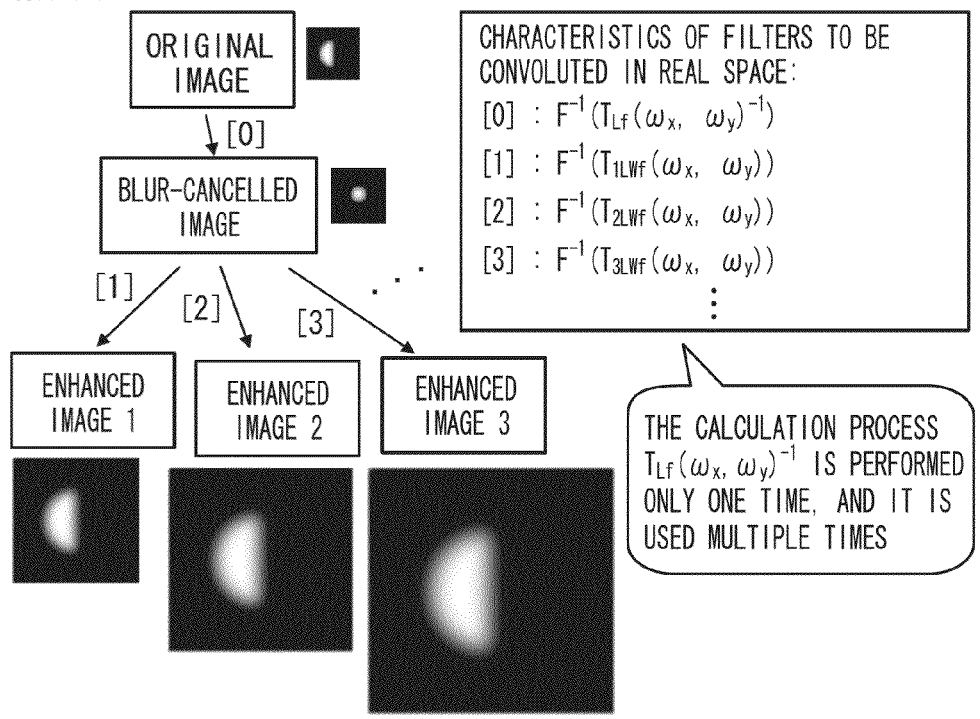
FIG. 20B is a conceptual diagram showing an ordinary process and a calculation-time shortening process when multiple second monocular 3D images are generated from a first monocular 3D image.

FIG. 20A and FIG. 20B are conceptual diagrams showing two kinds of processes (an ordinary process and a calculation-time shortening process) when multiple second monocular 3D process are generated from an original first monocular 3D process, respectively.

The ordinary process shown in FIG. 20A is comparable to the first embodiment shown in FIG. 15. In the ordinary process, the calculation process (the operation shown by [Formula 5]) of the transform filter to be convoluted with the first monocular 3D image in real space is performed whenever a second monocular 3D image different in the degree of the parallax enhancement or the like is generated. In the ordinary process, corresponding to multiple intended second monocular 3D images, the respective transform filters are calculated, and therefore, it is necessary to perform the calculation process for the transform filter multiple times, leading to an increase in the calculation amount.

The calculation-time shortening process shown in FIG. 20B is comparable to the third embodiment shown in FIG. 17. In the calculation-time shortening process, first, a blur-cancelled image in which the parallax and the blur have been cancelled is generated from an original first monocular 3D image. This blur-cancelled image can be generated by applying the first inverse filter or second inverse filter, which is the inverse filter of the first semilunar filter or second semilunar filter, to the left-eye image or right-eye image of the first monocular 3D images.

The first inverse filter is a filter whose filter coefficient is the amplitude component of the former part $F^{-1}(T_{Lf}(\omega_x, \omega_y)^{-1})$ in [Formula 5]. The calculation operation of the inverse filter is needed only one time. Alternatively, the calculation of the inverse filter can be omitted by previously operating and storing the inverse filter, because it is specific to the first monocular 3D image.

Subsequently, the third and fourth semilunar filters respectively corresponding to the multiple second monocular 3D images are applied to the single blur-cancelled image. The third semilunar filter is a filter whose filter coefficient is the amplitude component of the latter part $F^{-1}(T_{Lf}(\omega_x, \omega_y))$ in [Formula 5], and that is obtained by enlarging the first semilunar filter to a similar shape.

According to the calculation-time shortening process shown in FIG. 20B, unlike the ordinary process shown in FIG. 20A, the calculation of the transform filter is unnecessary, allowing for the shortening of the calculation time. This is effective, particularly, in the case of generating many second monocular 3D images in which the parallax changes continuously, and displaying them as a 3D moving image in which the parallax changes continuously.

<Accurate Comprehension of First and Second Semilunar Filters>

In the first and second semilunar filters applied to original monocular 3D images, the filter sizes are different depending on the parallax, as shown in FIG. 9A and FIG. 9B, and depend on various parameters other than the parallax.

Embodiments shown below, in which the first and second semilunar filters are accurately comprehended, achieve the improvement of the image quality of intended images to be generated based on them.

[First and Second Semilunar Filters Depending on Image Height]

As shown in FIG. 21, the shape of the semilunar filter is different depending on the image height. That is, the first and second semilunar filters applied to original monocular 3D images are left-right symmetric at an image height of zero (at the center of the image), as shown in FIG. 9A and FIG. 9B, if the sensitivity characteristic of the imaging element has a left-right symmetry. At a position where the image height is great in the pupil-division direction, the left-right symmetry of the first and second semilunar filters changes, and the shapes of the first and second semilunar filters are, for example, shapes into which a circle is two-divided by a straight line through a position that is deviated from the center of the circle in the left-right direction.

In the following, the reason for the change in the first and second semilunar filters depending on the image height is explained.

Figure 22A:
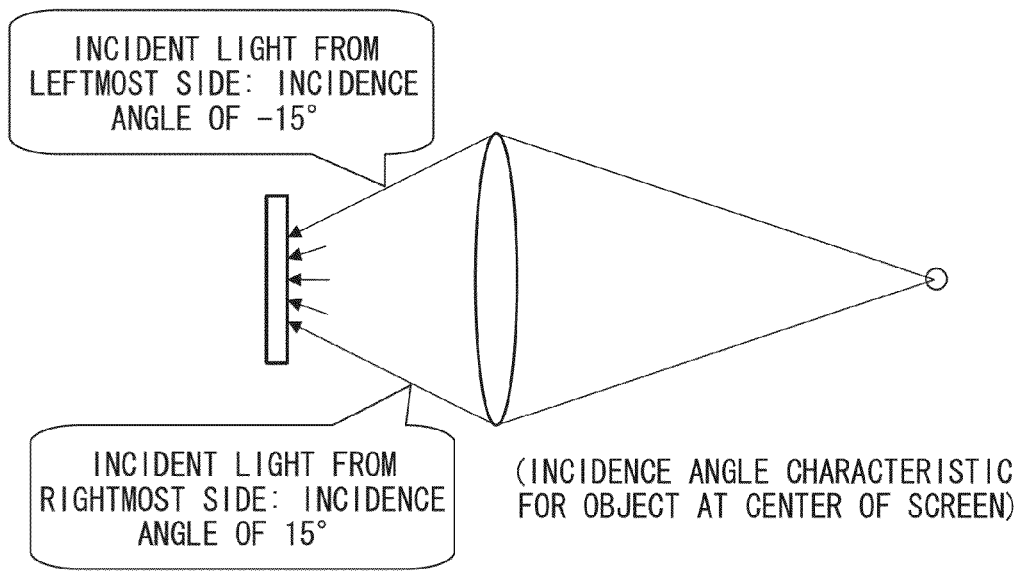
FIG. 22A is a diagram to be used for explaining a difference in incidence angle characteristic depending on the position in a screen.
Figure 22B:
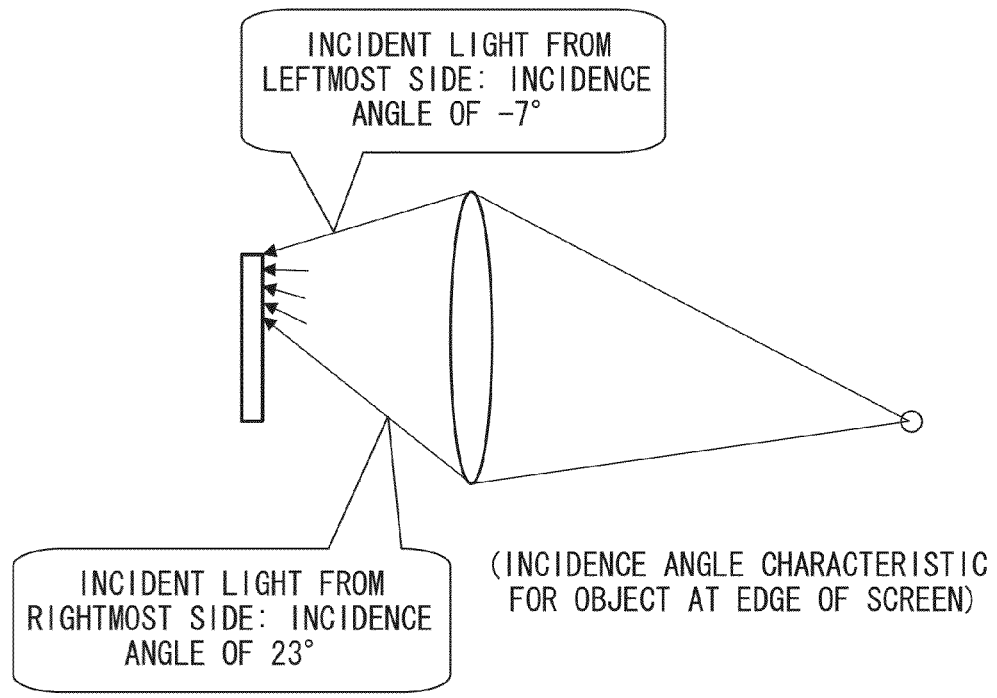
FIG. 22B is a diagram to be used for explaining the difference in incidence angle characteristic depending on the position in a screen.

As shown in FIG. 22A and FIG. 22B, the incidence angle for an object at the center of the screen and the incidence angle for an object at the edge of the screen are different. For example, the incidence angle for the object at the center of the screen is −15° to 15°, while the incidence angle for the object at the edge of the screen is −7° to 23°.

Figure 23:
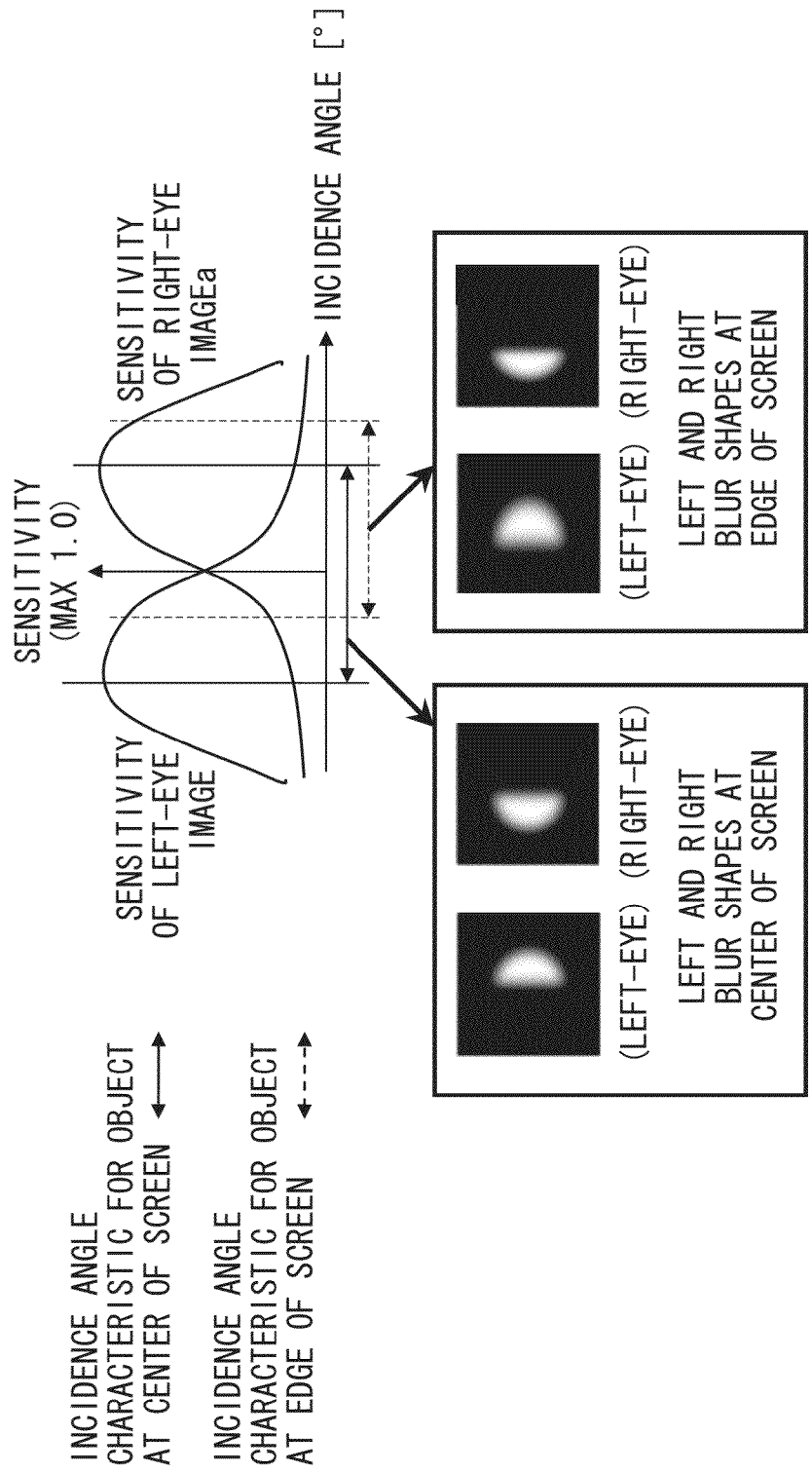
FIG. 23 is a diagram showing a difference in semilunar filters by the difference in incidence angle characteristic shown in FIG. 22A and FIG. 22B.

Thereby, as shown in FIG. 23, the incidence angle characteristics for the left-eye image and right-eye image of an object at the center of the screen are left-right symmetric, while the incidence angle characteristics for the left-eye image and right-eye image of an object at the edge of the screen are not left-right symmetric. As a result, the first and second semilunar filters for the object at the center (the image height is zero) of the screen are left-right symmetric, while the first and second semilunar filters for the object at the edge (the position where the image height is great) of the screen are different in shape.

Therefore, it is preferable to previously determine first and second semilunar filters depending on the image height. Then, when original first monocular 3D images are transformed into intended second monocular 3D images, first and second semilunar filters corresponding to the image height for a target pixel of the filtering process are used.

Thereby, it is possible to eliminate the influence of the difference in the picture shape depending on the image height, and to achieve the improvement of the image quality.

[First and Second Semilunar Filters Depending on Opening Shape of Diaphragm]

Figure 24A:
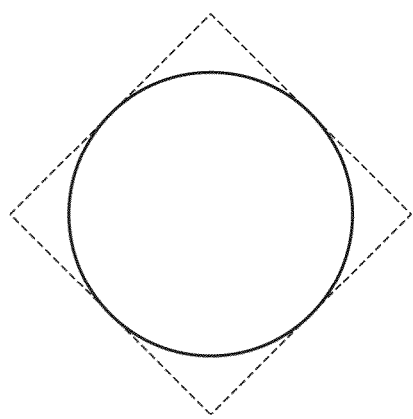
FIG. 24A is a diagram showing an example of an opening shape of a diaphragm of a lens.
Figure 24B:
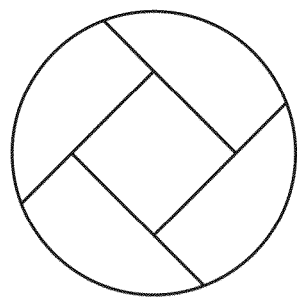
FIG. 24B is a diagram showing an example of an opening shape of a diaphragm of a lens.
Figure 24C:
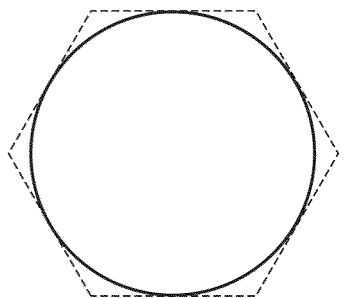
FIG. 24C is a diagram showing an example of an opening shape of a diaphragm of a lens.
Figure 24D:
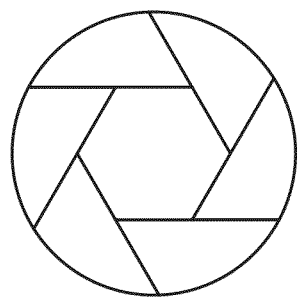
FIG. 24D is a diagram showing an example of an opening shape of a diaphragm of a lens.

FIG. 24A and FIG. 24B show a diaphragm of a lens that includes four diaphragm blades, and FIG. 24C and FIG. 24D show a diaphragm of a lens that includes six diaphragm blades.

FIG. 24A and FIG. 24C show states of open diaphragms in which the diaphragms of the lenses are fully opened, respectively, and the shapes of the diaphragm openings are circular shapes. Then, when the diaphragm of the lens shown in FIG. 24A is narrowed down from the open diaphragm, the diaphragm opening becomes a tetragonal shape as shown in FIG. 24B. When the diaphragm of the lens shown in FIG. 24C is narrowed down from the open diaphragm, the diaphragm opening becomes a hexagonal shape as shown in FIG. 24D.

The shape of the blur depends on the shape of the diaphragm. In the case where the diaphragm opening has a circular shape, for example, in the case of the open diaphragm, a point image is blurred in a circular shape, and is blurred in a semilunar shape on a monocular 3D image after it is pupil-divided into left and right (see FIG. 4).

Therefore, it is preferable that the first and second semilunar filters be adapted to the opening shape of the diaphragm at the time of the pickup of the monocular 3D images. That is, in the case where the shape of the diaphragm opening is a circular shape as shown in FIG. 24A and FIG. 24C, the first and second semilunar filters are made so as to have semilunar shapes. On the other hand, in the case where the shape of the diaphragm opening is a tetragonal shape as shown in FIG. 24B, the first and second semilunar filters are made so as to have trigonal shapes, and in the case where the shape of the diaphragm opening is a hexagonal shape as shown in FIG. 24D, they are made so as to have shapes after the hexagonal shape is two-divided into left and right.

That is, the shape of the diaphragm is comprehended for each diaphragm level, and a first and second semilunar filters adapted to the opening shape of the diaphragm at the time of the pickup of the monocular 3D images are applied. Here, the opening shape of the diaphragm of a lens includes various shapes without being limited to this embodiment, and a star-shaped diaphragm is also possible.

By using the first and second semilunar filters adapted to the opening shape of the diaphragm in this way, it is possible to eliminate the influence of the difference in the picture shape depending on the opening shape of the diaphragm, and to achieve the improvement of the image quality.

[First and Second Semilunar Filters Depending on Color of Three Primary Colors]

Figure 25A:
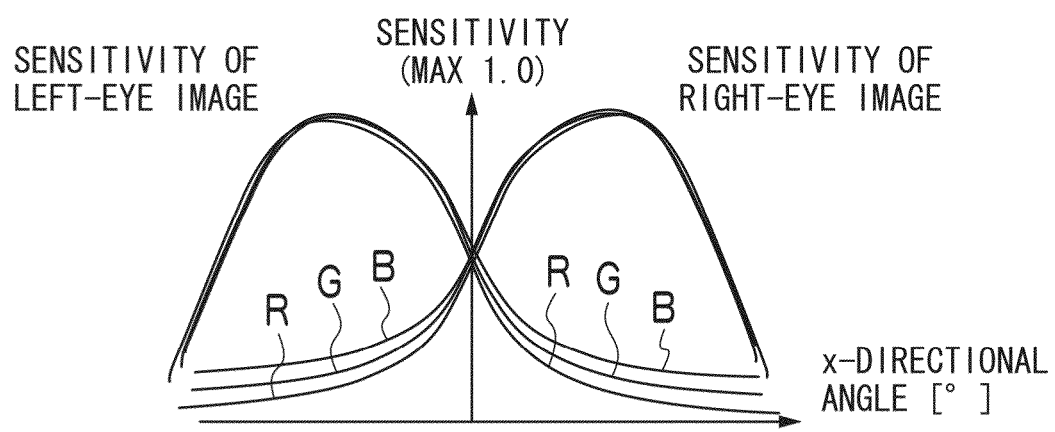
FIG. 25A is a graph showing an example of the sensitivities of a left-eye image and right-eye image for the x-directional angle [°] of the light entering a monocular 3D imaging element.
Figure 25B:
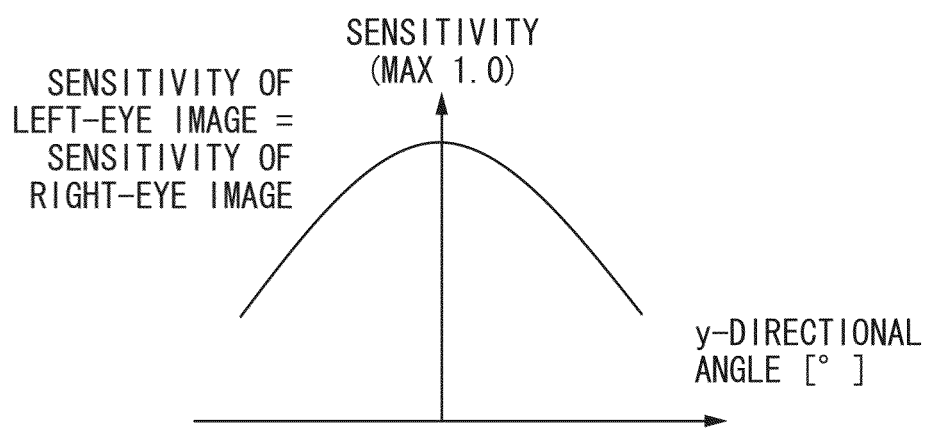
FIG. 25B is a graph showing an example of the sensitivities of the left-eye image and right-eye image for the y-directional angle [°] of the light entering the monocular 3D imaging element.

FIG. 25A and FIG. 25B are graphs showing an example of the sensitivities of a left-eye image and right-eye image for the x-directional angle [°] of the light entering the monocular 3D imaging element, and an example of the sensitivities of the left-eye image and right-eye image for the y-directional angle [°], respectively.

The sensitivities of the left-eye image and right-eye image for the x-directional angle [°] are different for each color of three primary colors: red (R), green (G) and blue (B).

As explained in FIG. 5, the first and second semilunar filters are determined depending on the sensitivities of the left-eye image and right-eye image for the angle of the light entering the monocular 3D imaging element. However, since the sensitivities are different for each of RGB, it is preferable to determine the first and second semilunar filters for each of RGB.

The digital signal processing unit 24 (the filtering processing unit) generates intended monocular 3D images for each of RGB, from original monocular 3D images, using the first and second semilunar filters determined for each of RGB, respectively. The above filtering process for each of RGB may be performed at the stage of RGB data (RAW data) corresponding to the color filter arrangement of the imaging element 16, or may be performed to RGB data after the synchronization process.

Thereby, it is possible to eliminate the influence of the difference in the picture shape for each of RGB, and to achieve the improvement of the image quality.

Further, in the case where the first and second semilunar filters applied to original monocular 3D images are determined for each of RGB as described above, it is preferable that the third and fourth semilunar filters to be applied to intended monocular 3D images be third and fourth semilunar filters common to RGB (for example, for G-pixels), instead of similar-shaped filters to which the first and second semilunar filters for each of RGB are enlarged.

Thereby, it is possible to correct the deviation of the centroids (parallaxes) among the colors, and further, it is possible to eliminate the influence of the difference in the picture shape for each of RGB and to achieve the improvement of the image quality.

[Image Process Depending on Chromatic Aberration]

Figure 26:
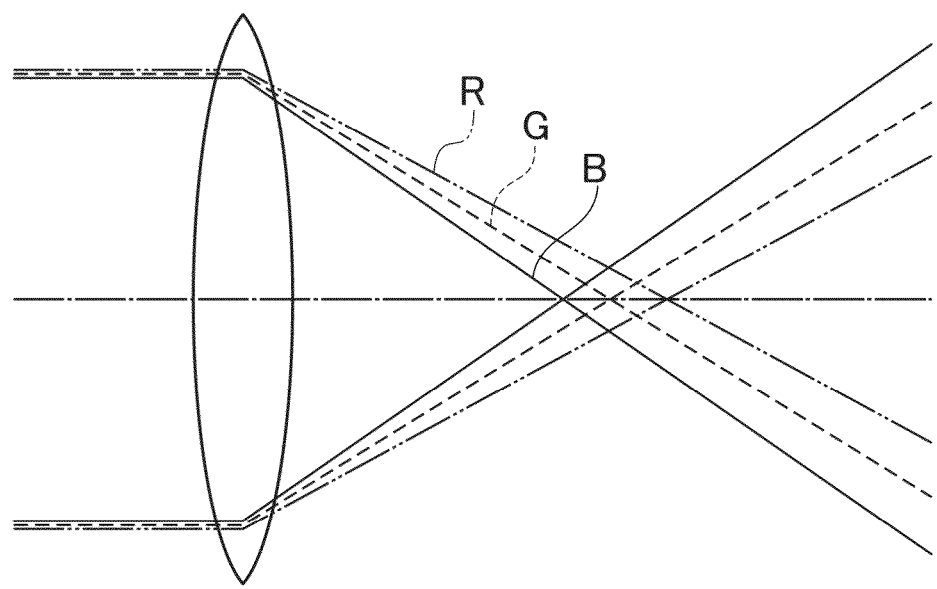
FIG. 26 is a diagram showing an example of the chromatic aberration for each of RBG.

Typically, a lens has an aberration called an axial chromatic aberration. FIG. 26 shows an example of the chromatic aberration for each of RGB.

In the case of a lens with a great chromatic aberration, when the parallax ΔD for original monocular 3D images is calculated from luminance signals that are generated from one particular color of RGB or from RGB signals, the result that the parallax ΔD is different for each color is produced even if the subjects are at the same length.

Hence, the parallax ΔD is comprehended for each of RGB, and the parallax map is created for each of RGB. The digital signal processing unit 24 (the filtering processing unit), which processes the respective original monocular 3D images for each color signal of RGB, uses the parallax map generated for each of the colors, as the parallax map to be used in the generation of intended parallax-increased monocular 3D images. Then, the corresponding parallax map is used for each of RGB, and thereby, the intended monocular 3D images are generated.

Thereby, it is possible to eliminate the influence of the chromatic aberration for each of RGB when the intended monocular 3D images are generated, and to achieve the improvement of the image quality.

Further, when the respective original monocular 3D images are processed for each color signal of RGB, it is preferable that, as described above, the first and second semilunar filters for each of RGB be used, and the third and fourth semilunar filters to be applied to the intended monocular 3D images be the third and fourth semilunar filters common to RGB (for example, for G-pixels).

As an alternative embodiment of the imaging device 10, for example, there are a portable telephone, a smart phone having a camera function, a PDA (Personal Digital Assistants), and a portable game machine. In the following, to take a smart phone as an example, the details are explained with reference to the drawings.

<Configuration of Smart Phone>

Figure 27:
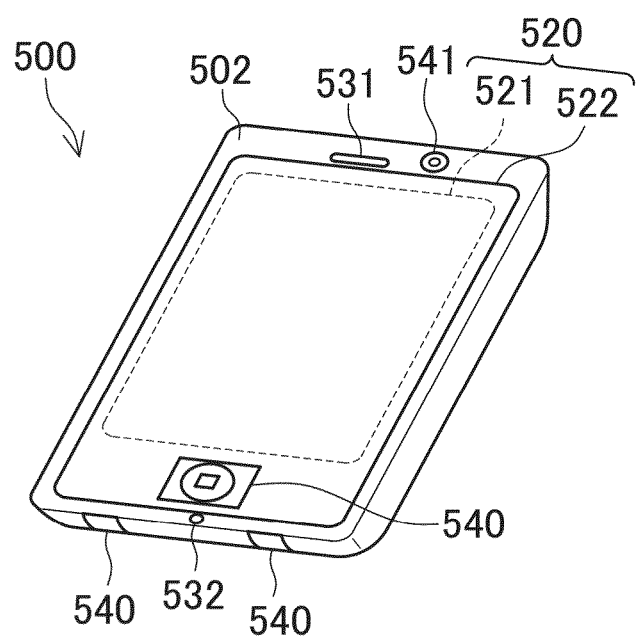
FIG. 27 is an external view of a smart phone that is an alternative embodiment of the imaging device.

FIG. 27 shows an external view of a smart phone 500 that is an alternative embodiment of the imaging device 10. The smart phone 500 shown in FIG. 27 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 28:
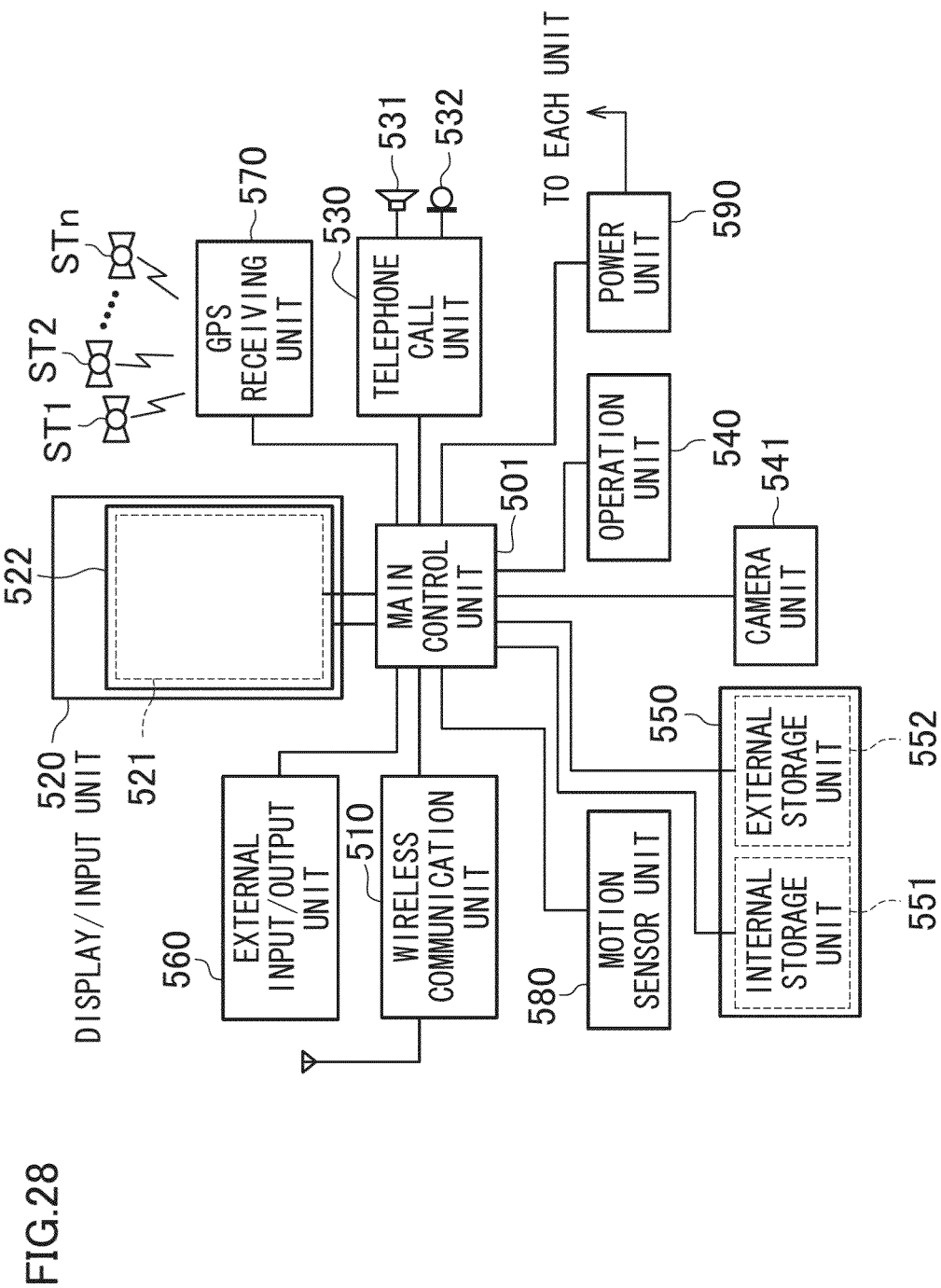
FIG. 28 is a block diagram showing the configuration of the principal part of the smart phone.

FIG. 28 is a block diagram showing the configuration of the smart phone 500 shown in FIG. 27. As shown in FIG. 28, the smart phone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called touch panel that, by the control from the main control unit 501, displays an image (a still image and a moving image), character information or the like to visually transmit the information to a user, and therewith, detects the user operation to the displayed information, and includes the display panel 521 and the operation panel 522. In the case of viewing a generated 3D image, it is preferable that the display panel 521 be a 3D display panel.

The display panel 521 is an LCD (Liquid Crystal Display), an OELD (Organic Electro-Luminescence Display) or the like that is used as a display device. The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 27, the display panel 521 and operation panel 522 of the smart phone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 27, for example, the speaker 531 can be mounted on the same surface as a surface on which the display/input unit 520 is provided, and the microphone 532 can be mounted on the side surface of the case 502.

The operation unit 540 is a hardware key using a key switch or the like, and receives an instruction from a user. For example, as shown in FIG. 28, the operation unit 540, which is mounted on the lower surface below the display unit of the case 502 of the smart phone 500, is a push-button switch that is turned on when being pushed by a finger or the like and becomes the off state by the restring force of a spring or the like when the finger is released.

The storage unit 550 stores a control program and control data of the main control unit 501, application software including the image process program for generating intended parallax-scaled monocular 3D images according to the present invention, the first and second semilunar filter groups, the first and second transform filter groups, the first and second inverse filter groups, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smart phone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD (R) memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth (R), RFID (Radio Frequency Identification), the infrared communication (Infrared Data Association: IrDA) (R), UWB (Ultra Wideband) (R), ZigBee (R), or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA to be connected by wire or wirelessly, a personal computer to be connected by wire or wirelessly, an earphone, and the like. The external input/output unit allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like, and detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, a function to generate a 3D image from a 2D image according to the present invention, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation touch panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation means not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charge-Coupled Device), and includes functions equivalent to the functions shown in the block diagram in FIG. 3. Further, by the control of the main control unit 501, the camera unit 541 can transform image data obtained by the pickup, into compressed image data such as JPEG (Joint Photographic Coding Experts Group), for example, and can record them in the storage unit 550, or output them through the external input/output unit 560 or the wireless communication unit 510. In the smart phone 500 shown in FIG. 27, the camera unit 541 is mounted on the same surface as the display/input unit 520. However, the mount position of the camera unit 541 is not limited to this. The camera unit 541 may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

In addition, it is possible to add the position information acquired by the GPS receiving unit 570, the voice information acquired by the microphone 532 (it may be the text information after the voice-text conversion by the main control unit or the like), the attitude information acquired by the motion sensor unit 580, or the like, to image data of still image or moving image, to store them in the storage unit 550, and to output them through the external input/output unit 560 or the wireless communication unit 510.

[Addition]

The present invention is not limited to the case of creating intended 3D still images from original monocular 3D still images, and can be applied to the case of generating intended 3D moving images from monocular 3D moving images, also.

Further, the imaging device 10 and the smart phone 500 includes the image processing device according to the present invention that picks up a 2D image and monocular 3D images, and generates intended 3D images from the actually picked-up original monocular 3D images. However, the present invention is not limited to this. For example, the present invention can be applied also to an image processing device (for example, a personal computer, a tablet PC or the like) that acquires original monocular 3D images through an external apparatus or communications, and generates intended 3D images from the acquired monocular 3D images. In this case, it is necessary to separately acquire the information of the first and second semilunar filter groups applied to the original monocular 3D images, and the like.

Further, in the embodiments, the spatial filtering in the real space region is performed for obtaining intended 3D images from original monocular 3D images, but the frequency filtering in the frequency region may be performed.

Moreover, needless to say, the present invention is not limited to the above embodiments, and various modifications are possible in a range without departing from the spirit of the present invention.

What is claimed is:

1. An image processing device comprising:
    an image acquisition device for acquiring a first image and a second image that are picked up through a single image-taking optical system and that have a parallax to each other, the first image and the second image being images after a pupil division by a pupil-division device;
    a parallax acquisition device for acquiring a parallax between corresponding pixels of the acquired first image and second image; and
    a filtering processing device for performing a filtering process for each pixel of the acquired first image and second image, using a first transform filter and a second transform filter corresponding to the parallax for the pixel acquired by the parallax acquisition device, the first transform filter and the second transform filter being of a first transform filter group and a second transform filter group for transforming into a third image and a fourth image in which a parallax amount and a blur amount of the acquired first image and second image have been altered, the first transform filter group being applied to the first image, the second transform filter group being applied to the second image.

2. The image processing device according to claim 1, wherein the filtering processing device increases the blur amount, as the parallax amount between corresponding pixels of the third image and the fourth image increases.

3. The image processing device according to claim 1, comprising:
    a digital filter storage device for storing a first digital filter group and a second digital filter group for each parallax, the first digital filter group and the second digital filter group corresponding to a transform characteristic by which light entering the single image-taking optical system is transformed into the first image and the second image; and
    a transform filter calculation device for calculating the first transform filter group and the second transform filter group, based on the stored first digital filter group and second digital filter group, and a third digital filter group and a fourth digital filter group for each pixel, the third digital filter group and the fourth digital filter group corresponding to a transform characteristic by which the light entering the single image-taking optical system is transformed into the third image and the fourth image,
    wherein, for each pixel of the acquired first image and second image, based on the parallax for the pixel acquired by the parallax acquisition device, the filtering processing device selects the first transform filter and second transform filter corresponding to the parallax, from the calculated first transform filter group and second transform filter group, and then performs the filtering process using the selected first transform filter and second transform filter.

4. The image processing device according to claim 3, wherein the transform filter calculation device calculates a transform filter to be convoluted in real space, by an amplitude component of the following formula, $$F^{-1}(T_f(\omega_x, \omega_y)^{-1} \cdot T_{wf}(\omega_x, \omega_y))$$

(here, $F^{-1}$: Fourier inverse transform),
    when any one digital filter of the first digital filter group and the second digital filter group stored in the digital filter storage device is $T(x, y)$, the digital filter $T(x, y)$ to which Fourier transform has been performed is $T_f(\omega_x, \omega_y)$, a digital filter that is of the third digital filter group and the fourth digital filter group and that corresponds to the digital filter $T(x, y)$ is $T_w(x, y)$, and the digital filter $T_w(x, y)$ to which Fourier transform has been performed is $T_{wf}(\omega_x, \omega_y)$.

5. The image processing device according to claim 3, comprising:
    a specification device for specifying a transform characteristic for the third image and the fourth image that are to be generated by the transform; and
    a digital filter calculation device for calculating the third digital filter group and fourth digital filter group corresponding to the specified transform characteristic,
    wherein the transform filter calculation device calculates the first transform filter group and the second transform filter group, using the first digital filter group and the second digital filter group stored in the digital filter storage device, and the third digital filter group and the fourth digital filter group calculated by the digital filter calculation device.

6. The image processing device according to claim 1, comprising a transform filter storage device for storing the first transform filter group and the second transform filter group for each parallax that are calculated based on a first digital filter group and a second digital filter group for each parallax and a third digital filter group and a fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image, wherein, for each pixel of the acquired first image and second image, based on the parallax for the pixel acquired by the parallax acquisition device, the filtering processing device reads the first transform filter and the second transform filter corresponding to the parallax, from the stored first transform filter group and second transform filter group, and then performs the filtering process using the read first transform filter and second transform filter.

7. The image processing device according to claim 6, wherein the transform filter storage device stores a transform filter to be convoluted in real space, the transform filter being calculated by an amplitude component of the following formula, $$F^{-1}(T_f(\omega_x, \omega_y)^{-1} \cdot T_w(\omega_x, \omega_y))$$

(here, $F^{-1}$: Fourier inverse transform), when any one digital filter of the first digital filter group and second digital filter group is $T(x, y)$, the digital filter $T(x, y)$ to which Fourier transform has been performed is $T_f(\omega_x, \omega_y)$, a digital filter that is of the third digital filter group and fourth digital filter group and that corresponds to the digital filter $T(x, y)$ is $T_w(x, y)$, and the digital filter $T_w(x, y)$ to which Fourier transform has been performed is $T_w(\omega_x, \omega_y)$.

8. The image processing device according to claim 6, comprising a specification device for specifying a transform characteristic for the third image and the fourth image that are to be generated by the transform, wherein the transform filter storage device stores the first transform filter group and the second transform filter group for each transform characteristic that are calculated based on a first digital filter group and a second digital filter group for each parallax and a third digital filter group and a fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image and supporting multiple transform characteristics that can be specified by the specification device, and the filtering processing device reads the first transform filter group and second transform filter group corresponding to the transform characteristic specified by the specification device, from the transform filter storage device, and uses the first transform filter group and the second transform filter group.

9. The image processing device according to claim 1, comprising an inverse filter storage device for storing an inverse filter group of a first digital filter group or a second digital filter group for each parallax, the first digital filter group or the second digital filter group corresponding to a transform characteristic by which light entering the single image-taking optical system is transformed into the first image or the second image, wherein the filtering processing device uses the stored inverse filter group, and a third digital filter group and a fourth digital filter group for each parallax, as the first transform filter group and the second transform filter group, the third digital filter group and the fourth digital filter group corresponding to a transform characteristic by which the light entering the single image-taking optical system is transformed into the third image and the fourth image.

10. The image processing device according to claim 9, comprising:

a specification device for specifying a transform characteristic for the third image and the fourth image that are to be generated by the transform; and a digital filter calculation device for calculating the third digital filter group and the fourth digital filter group corresponding to the specified transform characteristic, wherein the filtering processing device uses the third digital filter group and the fourth digital filter group calculated by the digital filter calculation device.

11. The image processing device according to claim 5, wherein the transform characteristic for the third image and fourth image to be specified by the specification device is at least one of a focal length, a diaphragm value, an imaging element size and a sensitivity characteristic of the image-taking optical system, the focal length, the diaphragm value, the imaging element size and the sensitivity characteristic being different from the first image and the second image.

12. The image processing device according to claim 5, wherein the third digital filter group and the fourth digital filter group have similar shapes to which the first digital filter group and the second digital filter group are scaled.

13. The image processing device according to claim 3, wherein the third digital filter group and the fourth digital filter group are digital filter groups in which each filter has a circular shape and a point-symmetric filter coefficient.

14. The image processing device according to claim 9, wherein in acquisition of the third image and the fourth image with multiple transform characteristics, the filtering processing device, for each pixel of the acquired first image or second image, performs a first operation to apply an inverse filter of the first digital filter or the second digital filter corresponding to the parallax for the pixel, and then applies, to the result of the first operation, the third digital filter and the fourth digital filter corresponding to the third image and the fourth image with the multiple transform characteristics, respectively.

15. The image processing device according to claim 3, wherein, as the first digital filter group and the second digital filter group, a first digital filter group and a second digital filter group having left-right symmetry to each other at a center of an image and changing the left-right symmetry depending on an image height in a pupil-division direction, are used.

16. The image processing device according to claim 3, wherein, as the first digital filter group and the second digital filter group, a first digital filter group and a second digital filter group having shapes into which an opening shape of a diaphragm is divided are used, the diaphragm being included in the image-taking optical system, the opening shape of the diaphragm being a shape when the first image and the second image are acquired.

17. The image processing device according to claim 3,
wherein the first image and the second image are color images that are output from a color imaging element and that have three primary colors, and as the first digital filter group and the second digital filter group, first digital filter groups and second digital filter groups that are different for each color, corresponding to a sensitivity characteristic for each color of the color imaging element, are used.

18. The image processing device according to claim 17, wherein, as the third digital filter group and the fourth digital filter group, a third digital filter group and a fourth digital filter group corresponding to a particular color of the three primary colors of the color images, are used.

19. The image processing device according to claim 1, wherein the first image and the second image are color images that are output from a color imaging element and that have three primary colors,
the parallax acquisition device calculates the parallax between the corresponding pixels of the acquired first image and second image, for each color, and
the filtering processing device performs the filtering process for the acquired first image and second image, for each color.

20. An imaging device comprising:
a single image-taking optical system;
an imaging element on which subject images are formed respectively, the subject images being images having passed through a first region and a second region and being images after a pupil division, the first region and the second region being different regions in the image-taking optical system, the imaging element performing a photoelectric conversion of the subject images having passed through the first region and the second region and outputting a first image and a second image, respectively;
the image acquisition device for acquiring the first image and the second image output from the imaging element; and
the image processing device according to claim 1.

21. An image processing method comprising:
an image acquisition step of acquiring a first image and a second image that are picked up through a single image-taking optical system and that have a parallax to each other, the first image and the second image being images after a pupil division by a pupil-division device;
a parallax acquisition step of acquiring a parallax between corresponding pixels of the acquired first image and second image; and
a filtering processing step of performing a filtering process for each pixel of the acquired first image and second image, using a first transform filter and a second transform filter corresponding to the parallax for the pixel acquired by the parallax acquisition step, the first transform filter and the second transform filter being of a first transform filter group and a second transform filter group for transforming into a third image and a fourth image in which a parallax amount and a blur amount of the acquired first image and second image have been altered, the first transform filter group being applied to the first image, the second transform filter group being applied to the second image.

22. The image processing method according to claim 21, further comprising:
a step of preparing a digital filter storage device for storing a first digital filter group and a second digital filter group for each parallax, the first digital filter group and the second digital filter group corresponding to a transform characteristic by which light entering the single image-taking optical system is transformed into the first image and the second image; and
a transform filter calculation step of calculating the first transform filter group and the second transform filter group, based on the stored first digital filter group and second digital filter group, and a third digital filter group and a fourth digital filter group for each pixel, the third digital filter group and the fourth digital filter group corresponding to a transform characteristic by which the light entering the single image-taking optical system is transformed into the third image and the fourth image,
wherein, in the filtering processing step, for each pixel of the acquired first image and second image, based on the parallax for the pixel acquired by the parallax acquisition step, the first transform filter and second transform filter corresponding to the parallax are selected from the calculated first transform filter group and second transform filter group, and then the filtering process is performed using the selected first transform filter and second transform filter.

23. The image processing method according to claim 21, further comprising, a step of preparing a transform filter storage device for storing the first transform filter group and the second transform filter group for each parallax that are calculated based on a first digital filter group and a second digital filter group for each parallax and a third digital filter group and a fourth digital filter group for each parallax, the first digital filter group and the second digital filter group corresponding to a transform characteristic by which light entering the single image-taking optical system is transformed into the first image and the second image, the third digital filter group and the fourth digital filter group corresponding to a transform characteristic by which the light entering the single image-taking optical system is transformed into the third image and the fourth image,
wherein, in the filtering processing step, for each pixel of the acquired first image and second image, based on the parallax for the pixel acquired by the parallax acquisition step, the first transform filter and the second transform filter corresponding to the parallax are read from the stored first transform filter group and second transform filter group, and then the filtering process is performed using the read first transform filter and second transform filter.

24. The image processing method according to claim 21, further comprising, a step of preparing an inverse filter storage device for storing an inverse filter group of a first digital filter group or a second digital filter group for each parallax, the first digital filter group or the second digital filter group corresponding to a transform characteristic by which light entering the single image-taking optical system is transformed into the first image or the second image,
wherein, in the filtering processing step, the stored inverse filter group, and a third digital filter group and a fourth digital filter group for each parallax are used as the first transform filter group and the second transform filter group, the third digital filter group and the fourth digital filter group corresponding to a transform characteristic by which the light entering the single image-taking optical system is transformed into the third image and the fourth image.

* * * * *